United States Patent
Jeon et al.

(10) Patent No.: US 9,709,827 B2
(45) Date of Patent: Jul. 18, 2017

(54) POLARIZING GLASSES FOR OBSERVING A STEREOSCOPIC IMAGE

(75) Inventors: Byoung Kun Jeon, Daejeon (KR);
Sergey Belyaev, Daejeon (KR); Moon Soo Park, Daejeon (KR); Sin Young Kim, Daejeon (KR)

(73) Assignee: LG CHEM, LTD., Seoul (KR)

( * ) Notice: Subject to any disclaimer, the term of this patent is extended or adjusted under 35 U.S.C. 154(b) by 0 days.

(21) Appl. No.: 13/187,271

(22) Filed: Jul. 20, 2011

(65) Prior Publication Data

US 2012/0044568 A1 Feb. 23, 2012

Related U.S. Application Data

(63) Continuation of application No. PCT/KR2011/005152, filed on Jul. 13, 2011.

(30) Foreign Application Priority Data

Jul. 13, 2010 (KR) .......................... 10-2010-0067353

(51) Int. Cl.
*G02B 27/26* (2006.01)
*G02C 7/12* (2006.01)

(52) U.S. Cl.
CPC ............... *G02C 7/12* (2013.01); *G02B 27/26* (2013.01); *H04N 2213/008* (2013.01)

(58) Field of Classification Search
CPC .... G02B 5/3033; G02B 5/3083; G02B 5/305; G02B 27/2214; G02B 27/26;
(Continued)

(56) References Cited

U.S. PATENT DOCUMENTS

| | | | |
|---|---|---|---|
| 4,719,507 A | * | 1/1988 | Bos .................................. 348/57 |
| 2006/0119766 A1 | * | 6/2006 | Mi et al. .......................... 349/96 |
| 2009/0087590 A1 | * | 4/2009 | Aiki et al. ...................... 428/1.1 |

FOREIGN PATENT DOCUMENTS

| | | | |
|---|---|---|---|
| CN | 101153985 A | | 4/2008 |
| CN | 101313049 A | | 11/2008 |

(Continued)

OTHER PUBLICATIONS

Ishinabe et al ("Novel Wide Viewing Angle Polarizer with High Achromaticity", SID 2000 Digest, pp. 1094-1097 (2000)).*

*Primary Examiner* — Stephone B Allen
*Assistant Examiner* — Jyotsna Dabbi
(74) *Attorney, Agent, or Firm* — Dentons US LLP

(57) ABSTRACT

Polarized glasses including an area for a left eye and an area for a right eye, into which an image signal enters, the areas for the left eye and for the right eye include an optical anisotropic layer and a polarizer respectively, the optical anisotropic layer includes at least one optical anisotropic film, and the optical anisotropic layer has a value calculated by Formula 1 in a range from 50 nm to 500 nm, and a value calculated by Formula 2 in a range from 0.1 to 3:

$DX-DY$ [Formula 1]

$(X-Y)/(Z-Y)$ [Formula 2]

where X is the refractive index in the direction of an in-plane slow axis of the optical anisotropic layer, Y represents the refractive index in the direction of an in-plane fast axis of the optical anisotropic layer, Z represents the refractive index in the direction in a thickness of the optical anisotropic layer, and D represents a thickness of the optical anisotropic layer.

17 Claims, 15 Drawing Sheets

(58) Field of Classification Search
CPC ............ G02B 27/2228; G02B 27/2257; G02B 5/3058; G02B 27/286; G02B 27/281; G02B 27/283; H04N 13/0404; H04N 13/0409; H04N 13/0497; H04N 13/0434; H04N 13/0459; H04N 13/0431; H04N 2213/008; G02F 1/133528; G02F 2001/13312; G02F 2001/13363; G02F 2001/133634; G02F 2001/1333; G02F 2001/1337; G02F 2001/133788; G02F 2001/133711; G02F 2001/133753; G02F 2001/133734; G02F 2001/133784; B32B 27/08; B32B 27/32; B32B 27/36; C08J 7/047; C08J 2367/02; G11B 5/72; G08J 5/18; G02C 7/12

See application file for complete search history.

(56) References Cited

FOREIGN PATENT DOCUMENTS

| | | |
|---|---|---|
| JP | 06-258634 | 9/1994 |
| JP | 10-232365 A | 9/1998 |
| JP | 11-234704 A | 8/1999 |
| JP | 2005-157082 | 6/2005 |
| JP | 2008-090173 | 4/2008 |
| JP | 2010-044206 | 2/2010 |
| WO | 2009/120009 A1 | 10/2009 |

\* cited by examiner

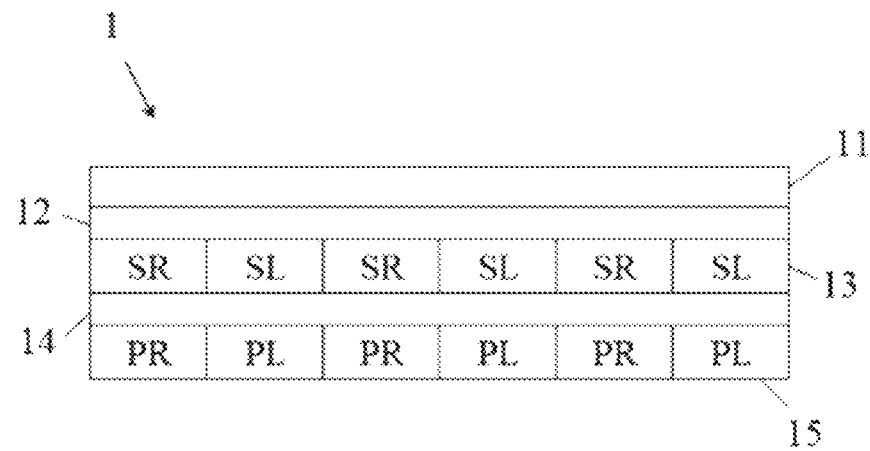
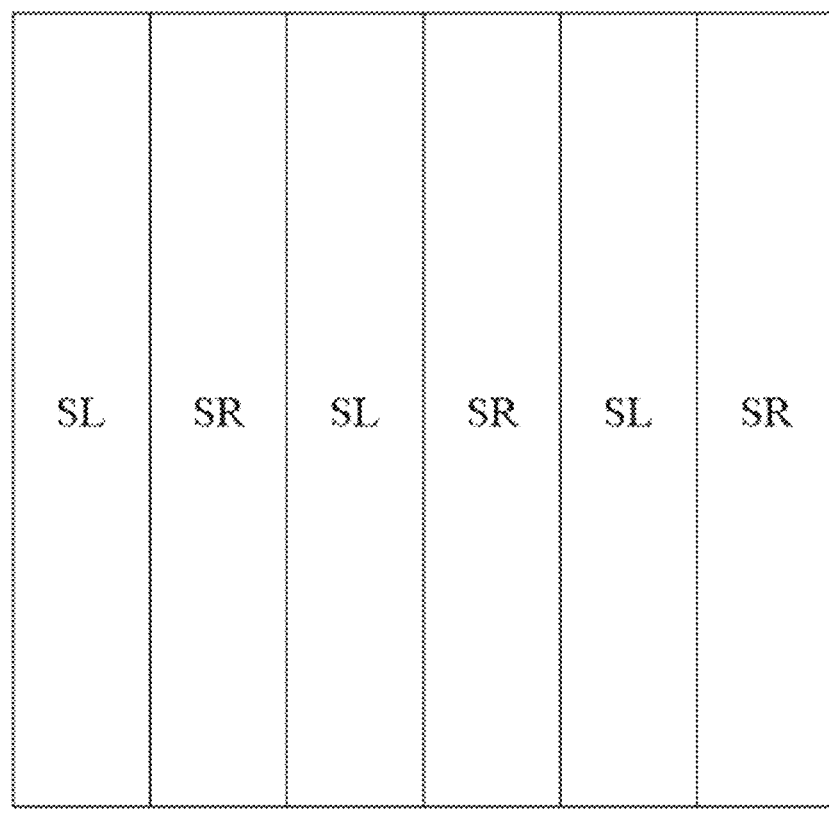

Fig. 3

| SL | SR | SL | SR | SL | SR |
| --- | --- | --- | --- | --- | --- |
| SR | SL | SR | SL | SR | SL |
| SL | SR | SL | SR | SL | SR |
| SR | SL | SR | SL | SR | SL |
| SL | SR | SL | SR | SL | SR |
| SR | SL | SR | SL | SR | SL |

Fig 4.

| PL | PR | PL | PR | PL | PR |
| --- | --- | --- | --- | --- | --- |

| PL | PR | PL | PR | PL | PR |
| PR | PL | PR | PL | PR | PL |
| PL | PR | PL | PR | PL | PR |
| PR | PL | PR | PL | PR | PL |
| PL | PR | PL | PR | PL | PR |
| PR | PL | PR | PL | PR | PL |

POLARIZING GLASSES FOR OBSERVING A STEREOSCOPIC IMAGE

This application is a Continuation application, under 35 U.S.C. §120, of International Patent Application No: PCT/KR2011/005152, filed on Jul. 13, 2011, which claims priority to Korean Application No. 10-2010-0067353, filed on Jul. 13, 2010, both of which are incorporated by reference in their entirety herein.

BACKGROUND

1. Field of the Invention

The present invention relates to polarizing glasses and a stereoscopic image display device.

2. Discussion of Related Art

As methods for realizing stereoscopic images, methods that use glasses and methods that do not use glasses are known. The methods that use glasses can be classified into those using polarizing glasses and those using LC shutter glasses and the methods that do not use glasses can be classified into a dual/multi-view binocular disparity methods, a volumetric methods, and a holographic methods.

A crosstalk which becomes problematic when observing stereoscopic images may occur, for example, when a left eye signal that should enter into the left eye enters into the right eye or a right eye signal that should enter into the right eye enters into the left eye. The crosstalk decreases the quality of stereoscopic images and viewing angles.

SUMMARY OF THE INVENTION

The present invention relates to polarizing glasses and a stereoscopic image display device.

The present invention relates polarizing glasses that include an area for the left eye and an area for the right eye, into which an image signal enters. Each of the area for the left eye and the area for the right eye includes an optical anisotropic layer and a polarizer. The optical anisotropic layer includes at least one optical anisotropic film. The optical anisotropic layer has the value calculated as in the Formula 1 in the range from 50 nm to 500 nm, and the value calculated as in the Formula 2 in the range from 0.1 to 3.

$$DX-DY \quad \text{[Formula 1]}$$

$$(X-Y)/(Z-Y) \quad \text{[Formula 2]}$$

In the Formulas 1 and 2, X is the refractive index in the direction of an in-plane slow axis of the optical anisotropic layer, Y represents the refractive index in the direction of an in-plane fast axis of the optical anisotropic layer, Z represents the refractive index in the direction of a thickness of the optical anisotropic layer, and D represents a thickness of the optical anisotropic layer.

Hereinafter, the polarizing glasses will be described in detail.

Terms "perpendicular," "horizontal," "orthogonal," or "parallel" as used herein may refer "substantially" perpendicular, "substantially" horizontal, "substantially" orthogonal, or "substantially" parallel within the range that does not damage an aimed effect. In one embodiment, the above terms may include an error due to a manufacturing error or variation. For example, each term may have an error within about ±20 degrees, preferably an error of within about ±15 degrees, more preferably an error of within about ±10 degrees, and most preferably an error of within about ±5 degrees.

In this specification, "X," "Y," "Z," and "D" may refer to the refractive index in the direction of an in-plane slow axis of the optical anisotropic layer or film, the refractive index in the direction of an in-plane fast axis of the optical anisotropic layer or film, the refractive index in the direction of a thickness of the optical anisotropic layer or film, and a thickness of the optical anisotropic layer or film respectively. The refractive indices may be refractive indices measured with respect to light having a wavelength of 550 nm.

Further, the term "in-plane retardation ($R_{in}$) as used herein may refer to a property of the optical anisotropic layer or film calculated as in the Formula 3, and the term "retardation in a thickness direction ($R_{th}$) may refer to a property of the optical anisotropic layer or film calculated as in the Formula 4.

$$R_{in}=(X-Y)\times D \quad \text{[Formula 3]}$$

$$R_{th}=(Z-Y)\times D \quad \text{[Formula 4]}$$

In one embodiment, the polarizing glasses may be used to observe a stereoscopic image. In other embodiment, the polarizing glasses may be used to observe a stereoscopic image that includes a right eye signal and a left eye signal which are linearly polarized signals of which polarizing axes are perpendicular from each other, or to used to observe a stereoscopic image that includes left-circularly polarized light and right-circularly polarized light.

For the convenience of description, an exemplary stereoscopic image display device that displays the stereoscopic image which can be observed by the polarizing glasses will be described.

The exemplary stereoscopic image display device may include an image generating unit that is capable of generating image signals including a right eye signal and a left eye signal and then is capable of transferring the generated signals to an observer side in a driven state; and a polarization adjusting element that is capable of receiving the image signals transferred from the image generating unit, and then is capable of transferring the left eye signal and the right eye signal after adjusting the signals so as to have different polarized states from each other.

The term "driven state" as used herein may refer to a state where the stereoscopic image display device is displaying the stereoscopic image.

FIG. 1 shows a schematic of an illustrative embodiment of the exemplary stereoscopic image display device 1.

The stereoscopic image display device 1 may include a light source 11, the image generating unit, and the polarization adjusting element 15 which are sequentially arranged in a direction toward an observer. The image generating unit may include a first polarizing plate 12, an image generating element 13, and a second polarizing plate 14.

In one embodiment, the observer may observe a stereoscopic image emitted from the stereoscopic image display device 1 with wearing polarizing glasses.

In the stereoscopic image display device 1 of FIG. 1, the light source 11 may emit non-polarized white light toward the first polarizing plate 12 in the driven state. As the light source 11, for example, a direct-type or edge-type backlight unit (BLU) which is typically used in a liquid crystal display (LCD) or the like may be used.

The image generating unit may include the image generating element 13 and the first and second polarizing plates 12 and 14 arranged on both sides of the image generating elements 13. The first polarizing plate 12 may have a light transmitting axis and a light absorbing axis which is orthogonal to the light transmitting axis. If light emitted from the light source 11 enters into the first polarizing plate 12, the first polarizing plate 12 may transmit only light having a polarizing axis parallel to a direction of the light transmitting axis. The term "direction of the polarizing axis" as used herein may refer to a vibration direction of an electric field in light.

In one embodiment, the image generating element 13 may be a transmissive LCD panel in which one or more pixels capable of generating a left eye signal or a right eye signal are arranged in a line direction and/or a row direction. The panel may generates image signals including the left eye signal and the right eye signal by driving the pixels according to signals and then transfer the generated image signals toward the second polarizing plate 14. In one embodiment, the transmissive LCD panel may include a substrate, a pixel electrode, a first alignment film, a liquid crystal layer, a second alignment film, a common electrode, a color filter, and a substrate which are arranged sequentially from the light source 11. The panel may include a right eye signal generating area (SR) capable of generating the right eye signal and a left eye signal generating area (SL) capable of generating the left eye signal. The right eye signal generating area SR and the left eye signal generating area SL may be formed of a unit pixel or a combination of two or more pixels. The right eye signal generating area SR and the left eye signal generating area SL may have a stripe shape extending in a common direction respectively, and are alternately arranged on the short-sided direction of the stripe shape as illustrated in FIG. 2 or may be alternately arranged forming a lattice pattern as illustrated in FIG. 3.

In the driven state of the stereoscopic image display device, the right eye signal generating area SR and the left eye signal generating area SL may generate the right eye signal and the left eye signal, respectively, and then transfer the right eye signal and the left eye signal to the observer. For example, when the device 1 of FIG. 1 is driven, light emitted from the light source 11 transmits the first polarizing plate 12 and then enters into the image generating element 13. Of light that has entered into the image generating element 13, light that has passed through the right signal generating area SR may become the right eye signal, and light that has passed through the left signal generating area SL may become the left eye signal.

If the right eye signal and the left eye signal enter into the second polarizing plate 14, the second polarizing plate 14 allows only light parallel to the light transmitting axis thereof to pass through. In one embodiment, the first and second polarizing plates 12 and 14 may be arranged such that their light transmitting axes are perpendicular from each other.

The polarization adjusting element 15 may include at least one polarization adjusting area PR for the right eye signal (hereinafter, it may be referred to as "the area for the right eye") and at least one polarization adjusting area PL for the left eye signal (hereinafter, it may be referred to as "the area for the left eye"). The area for the right eye PR may be arranged to receive the right eye signal generated and transferred from the right eye signal generating area SR, and the area for the left eye PL may be arranged to receive the left eye signal generated and transferred from the left eye signal generating area SL. In one embodiment, if the right eye signal generating area SR and the left eye signal generating area SL of the image generating element 13 are arranged as illustrated in FIG. 2, the area for the right eye PR and area for the left eye PL may be arranged in a corresponding form as illustrated in FIG. 4, whereas if the right eye signal generating area SR and the left eye signal generating area SL of the image generating element 13 are arranged as illustrated in FIG. 3, the area for the right eye PR and area for the left eye PL may be arranged in a corresponding form as illustrated in FIG. 5, but is not limited thereto.

The right eye signal and the left eye signal that have passed through the polarization adjusting element 15 may have different polarized states from each other. In one embodiment, the right eye signal and the left eye signal that have pass through the polarization adjusting element 15 may be linearly polarized lights having polarization directions which are substantially perpendicular from each other or may be right-circularly polarized light and left-circularly polarized light respectively.

If the right eye signal and the left eye signal are right-circularly polarized light and left-circularly polarized light, one of the area for the right eye PR and the area for the left eye PL may be an area capable of converting incident light into left-circularly polarized light, and the other may be an area capable of converting incident light into right-circularly polarized light. In this case, both of the area for the right eye PR and the area for the left eye PL of the polarization adjusting element 15 may include a quarter wave ($\lambda$/4) plate layers. The quarter wave plate layers of the area for the right eye PR and the area for the left eye PL may have different optical axes from each other. The term "quarter wave plate" as used herein may refer to a phase retardation element capable of delaying a phase of incident light by ¼ of the wavelength of the light. The term "optical axis" as used herein may refer to an fast axis or a slow axis while incident light passes through a corresponding area and may preferably refer to the slow axis. In one embodiment, if the quarter wave plates of the area for the right eye PR and the area for the left eye PL have different optical axes from each other, the optical axes of the quarter wave plates may be perpendicular from each other.

In another embodiment, one of the area for the right eye PR and the area for the left eye PL may include a 3$\lambda$/4 plate, and the other may include a $\lambda$/4 plate. The term "3$\lambda$/4 plate" as used herein may refer to a phase retardation element capable of delaying a phase of incident light by ¾ of the wavelength of the light. The 3$\lambda$/4 plate may be formed by laminating a $\lambda$/2 plate that is capable of delaying a phase of incident light by ½ of its wavelength and a quarter wave plate.

In case where the signals that have passed through the polarization adjusting element 15 are linearly polarized light having directions substantially perpendicular from each other, the polarization adjusting element 15 may include a $\lambda$/2 plate, which is formed on at least one portion only corresponding to the area for the right eye PR or the area for the left eye PL. The term "$\lambda$/2 plate" as used herein may refer to a phase retardation element capable of delaying a phase of incident light by ½ of its wavelength as described above. In one embodiment, one of the area for the right eye PR or the area for the left eye PL may be an area that allows incident light to transmit without rotating the polarizing axis thereof, and the other may be an area that allows incident light to transmit after the polarizing axis of the incident light being rotated to be orthogonal to the polarizing axis of light whose polarizing axis is not rotated. Therefore, the polarizing axes of light having passed through the area for the right eye PR and light having passed through the area for the left eye PL have directions orthogonal from each other. In this case, glass or transparent resin may be arranged in at least one area only corresponding to the area for the right eye PR or the area for the left eye PL, and the $\lambda$/2 plate having an optical axis capable of rotating the polarizing axis of incident light to be perpendicular to light having passed through the glass or transparent resin may be arranged in the other area.

In one embodiment, the polarizing glasses may be glasses for observing the image signal emitted from the stereoscopic image display device. Preferably, the polarizing glasses may be glasses for observing the image signal that includes left-circularly polarized light and right-circularly polarized light that is emitted from the device. The stereoscopic image display device that emits the image signal including the left-circularly polarized light and the right-circularly polarized light may include a polarization adjusting element in which both of the area for the right eye PR and the area for the left eye PL include the λ/4 plate, and the optical axis of the λ/4 plate of the area for the right eye PR is different from the optical axis of the λ/4 plate of the area for the left eye PL. Also, the stereoscopic image display device that emits the image signal including the left-circularly polarized light and the right-circularly polarized light may include a polarization adjusting element in which one of the area for the right eye PR and the area for the left eye PL includes a 3λ/4 plate, and the other includes a λ/4 plate. Preferably, the stereoscopic image display device may include the polarization adjusting element in which both the area for the right eye PR and the area for the left eye PL include the λ/4 plate, and the optical axis of the λ/4 plate of the area for the right eye PR is different from the optical axis of the λ/4 plate of the area for the left eye PL.

The polarizing glasses include the area for the left eye which may be positioned in front of the observer's left eye when the observer wears the glasses and the area for the right eye which may be positioned in front of the observer's right eye when the observer wears the glasses. For example, when observing the stereoscopic image, the left eye signal may enter into the area for the left eye, and the right eye signal may enter into the area for the left eye. In the polarizing glasses, for example, an optical anisotropic layer and a polarizer may be arranged such that the image signal passes through the optical anisotropic layer, and then passes through the polarizer, and then enters into the observer's left eye or right eye. FIG. 6 is a top view of polarizing glasses 6. In the polarizing glasses 6, the area for the left eye may include an optical anisotropic layer 61L and a polarizer 62L, and the area for the right eye may include an optical anisotropic layer 61R and a polarizer 62R. Arrows illustrated in FIG. 6 may represent a direction along which the image signal transferred from the stereoscopic image display device proceeds.

The area for the right eye and the area for the left eye of the polarizing glasses include the optical anisotropic layer along with the polarizer. The optical anisotropic layer may have the value calculated as in the Formula 1 in the range from 50 nm to 500 nm, and the value calculated as in Formula 2 in the range from 0.1 to 3. The value calculated as in the Formula 1 is an in-plane retardation ($R_{in}$) of the optical anisotropic layer, and the value calculated as in Formula 2 is a ratio ($R_{in}/R_{th}$) of the in-plane retardation ($R_{in}$) of the optical anisotropic layer with respect to a retardation in a thickness direction ($R_{th}$) of the optical anisotropic layer. In the optical anisotropic layer, the value calculated as in the Formula 1 may be in the range of 50 nm to 450 nm, preferably in the range of 50 nm to 400 nm, and more preferably in the range of 100 nm to 400 nm. In the optical anisotropic layer, the value calculated as in Formula 2 may be in the range of 0.5 to 2.5 and preferably in the range of 0.5 to 2.

In the Formulas 1 and 2, X may represent the refractive index in the direction of an in-plane slow axis of the optical anisotropic layer, for example, the refractive index with respect to light having the wavelength of 550 nm of an in-plane slow axis of the optical anisotropic layer; Y may represent the refractive index in the direction of an in-plane fast axis of the optical anisotropic layer, for example, the refractive index with respect to light having the wavelength of 550 nm of an in-plane fast axis of the optical anisotropic layer; Z may represent the refractive index in the direction of a thickness of the optical anisotropic layer, for example the refractive index with respect to light having the wavelength of 550 nm of the direction of a thickness of the optical anisotropic layer; and D may represent a thickness of the optical anisotropic layer.

If the value of the optical anisotropic layer calculated by the Formula 1 is 50 nm or more and also 500 nm or less, it is possible for an observer wearing the polarizing glasses to observe the stereoscopic image with the high quality. If the value of the optical anisotropic layer calculated by the Formula 2 is 0.1 or more and also 3 or less, it is possible for an observer wearing the polarizing glasses to observe the stereoscopic image with the high quality.

In one embodiment, an optical axis of the optical anisotropic film of the area for the left eye may have a direction different from an optical axis of the optical anisotropic film of the area for the right eye. Further, a bisector of an angle formed by the optical axis of the optical anisotropic film of the area for the left eye and the optical axis of the optical anisotropic film of the area for the right eye may be perpendicular or parallel to the light absorbing axis of the polarizer of the polarizing glasses. Further, an angle formed by the optical axis of the optical anisotropic film of the area for the left eye and the optical axis of the optical anisotropic film of the area for the right eye may be 90 degrees. It may become possible for an observer wearing polarizing glasses having the above relation to observe the stereoscopic image with high quality. The term "bisector of the optical axes" as used herein may refer to a line dividing an angle formed by the two optical axes which are formed in different directions from each other in half. For example, referring to FIG. 7, the angle formed by the optical axis AR of the area for the right eye GR and the optical axis AL of the area for the right eye GL is β degrees or (360−β) degrees. If β1 degrees and β2 degrees in FIG. 7 are equal, a bisector of the angle formed by the optical axes AL and AR may be a line 80 indicated by the dotted line or a line formed in a direction perpendicular to the line 80 indicated by the dotted line.

In case where the areas for the right eye and the left eye include two or more optical anisotropic films as will be described later, at least one film among the optical anisotropic films in the area for the left eye and at least one film among the optical anisotropic films in the area for the right eye may be formed with having the above relation. In the above case, the other films may have the optical axes in the same direction as the above films in the same areas or may have the optical axes in a direction perpendicular to the light absorbing axis of the polarizer of the polarizing glasses.

The optical anisotropic layer may include one or more optical anisotropic films as long as it satisfies the values calculated by the Formulas 1 and 2.

If only one optical anisotropic film is used in the areas respectively, X, Y, Z and D of the film may be considered as X, Y, Z, and D of the entire optical anisotropic layer respectively.

In case where the optical anisotropic layer includes two or more optical anisotropic films, X, Y, Z, and D of the entire optical anisotropic layer that are applied to the Formulas 1 and 2 may be values obtained by adding X's, Y's, Z's, and D's of the two or more films. For example, if an optical anisotropic film of which the refractive index in the direction of an in-plane slow axis is X1, the refractive index in the direction of an in-plane fast axis is Y1, the refractive index in the direction of a thickness direction is Z1, and the thickness is D1; and an optical anisotropic film of which the refractive index in the direction of an in-plane slow axis is X2, the refractive index in the direction of an in-plane fast axis is Y2, the refractive index in the direction of a thickness direction is Z2, and the thickness is D2 is included in the optical anisotropic layer, X, Y, Z, and D substituted in the Formulas 1 and 2 may be "X1+X2," "Y1+Y2," "Z1+Z2," and "D1+D2" respectively.

Also, it is possible to measure the in-plane retardation $R_{in}$ with respect to light having the wavelength of 550 nm and the retardation in a thickness direction $R_{th}$ with respect to light having the wavelength of 550 nm, and then to consider the measured in-plane retardation $R_{in}$ as the value calculated by the Formula 1, and to consider the ratio $R_{in}/R_{th}$ of the measured in-plane retardation $R_{in}$ to the measured retardation in a thickness direction $R_{th}$ as the value calculated by the Formula 2. Further, in case where the optical anisotropic layer includes a plurality of optical anisotropic films, it is also possible to add up the in-plane retardation of each film and to add up the retardation in a thickness direction, and then calculate the values calculated by the Formulas 1 and 2 according to the above method. For example, if the optical anisotropic layer includes an optical anisotropic film whose in-plane retardation is I1 and whose retardation in a thickness direction is T1, and an optical anisotropic film whose in-plane retardation is I2 and whose retardation in a thickness direction is T2, the in-plane retardation of the entire optical anisotropic layer may be "I1−I2," and the retardation in a thickness direction of the entire optical anisotropic layer may be "T1+T2." Therefore, in the above case, the value calculated by the Formula 1 may be "I1−I2," and the value calculated by the Formula 2 may be "(I1−I2)/(T1+T2)."

In one embodiment, the optical anisotropic layer may include at least one selected from a group consisting of an A plate, a B plate, and a C plate.

The term "A plate" as used herein may refer to an optical anisotropic film of which the refractive index X in the direction of an in-plane slow axis, the refractive index Y in the direction of an in-plane fast axis, and the refractive index Z in the direction of a thickness satisfy the relation of "X≠Y=Z." Among the A plate, a plate, in which X is larger than Y, may be referred to as a "+A plate," and a plate, in which X is smaller than Y, may be referred to as a "−A plate." The term "B plate" as used herein may refer to an optical anisotropic film of which the refractive index X in the direction of an in-plane slow axis, the refractive index Y in the direction of an in-plane fast axis, and the refractive index Z in the direction of a thickness satisfy the relation of "X≠Y≠Z." Among the B plate, a plate, in which Z is larger than Y, may be referred to as a "+B plate," and a plate, in which Z is smaller than Y, may be referred to as a "−B plate. The term "C plate" as used herein may refer to an optical anisotropic film of which the refractive index X in the direction of an in-plane slow axis, the refractive index Y in the direction of an in-plane fast axis, and the refractive index Z in the direction of a thickness satisfy the relation of "X=Y≠Z." Among the C plates, a plate, in which Z is larger than Y, may be referred to as a "+C plate," and a plate, in which Z is smaller than Y, may be referred to as a "−C plate."

As a material constituting the A, B, and C plates, various materials known for forming the optical anisotropic films in the art can be used. In one embodiment, the retardation film may be a liquid crystal (LC) film or a polymer film such as a film including polyacrylate, poly-carbonate, or cyclic olefin polymer (COP). In the case of the polymer film, a film of which retardation properties are controlled by, for example, by a single-axial or bi-axial elongation may be used.

Another exemplary polarizing glasses may include an area for the left eye and an area for the right eye into which an image signal enters. The area for the left eye and the area for the right eye may include an optical anisotropic layer and a polarizer respectively. The optical anisotropic layer may includes a first A plate or a first B plate. A bisector of an angle formed by an optical axis of the first A plate or the first B plate of the area for the left eye and an optical axis of the first A plate or the first B plate of the area for the right eye may be perpendicular to or parallel to a light absorbing axis of the polarizer.

In the polarizing glasses, the optical anisotropic layer may further include at least one selected from a group consisting of a second A plate, a second B plate and a C plate. In one embodiment, an optical axis of the second A plate or the second B plate of the area for the left eye may be parallel to the optical axis of the first A plate or the first B plate of the area for the left eye, and an optical axis of the second A plate or the second B plate of the area for the right eye may be parallel to the optical axis of the first A plate or the first B plate of the area for the right eye. In another embodiment, the second A plate or the second B plate of the area for the left eye and the second A plate or the second B plate of the area for the right eye may have optical axes in a direction perpendicular to the light absorbing axis of the polarizer.

Hereinafter, polarizing glasses having the optical anisotropic layer of which the values calculated as in Formulas 1 and 2 are within the specific values as described above may be referred to as a "first polarizing glasses," and polarizing glasses having the optical anisotropic layer including the first A plate or the first B plate may be referred to as a "second polarizing glasses."

In this specification, a detailed description of the polarizing glasses may be similarly applied to the first and second polarizing glasses within the range not hindering the object. For example, the A plate or the B plate of the second polarizing glasses may be the optical anisotropic film included in the optical anisotropic layer of the first polarizing glasses.

Also, the optical anisotropic layer of the second polarizing glasses may have the value calculated as in the Formula 1 in the range from 50 nm to 500 nm, and the value calculated as in the Formula 2 in the range from 0.1 to 3.

Preferably, each of the optical anisotropic layers of the area for the left eye and the area for the right eye of the first or second polarizing glasses may include at least one B plate or at least one A plate. An optical axis of the B or A plate in the area for the left eye may have different direction from an optical axis of the B or A plate in the area for the right eye. A bisector of an angle formed by the optical axis of the B or A plate in the area for the left eye and the optical axis of the B or A plate in the area for the right eye may be perpendicular or parallel to the light absorbing axis of the polarizer of the polarizing glasses. In the above case, an angle formed by the optical axes of the plates in the area for the left eye and in the area for the right eye may be 90 degrees.

In one embodiment, the optical anisotropic layer of the first or second polarizing glasses may include a B plate (hereinafter, may be referred to as "first type") or may include an A plate and a C plate (hereinafter, may be referred to as "second type").

In the first type of the polarizing glasses, an optical axis of at least one of B plates in the area for the left eye may have a different direction from an optical axis of at least one of B plates in the area for the right eye. Also, a bisector of an angle formed by the optical axis of the at least one of the B plate in the area for the left eye and the optical axis of the at least one of the B plate in the area for the right eye may be perpendicular or parallel to the light absorbing axis of the polarizer of the polarizing glasses. In the above case, an angle formed by the optical axis of the at least one of the B plate in the area for the left eye and the optical axis of the at least one of the B plate in the area for the right eye may be 90 degrees.

In the case of the first type of the polarizing glasses, the optical anisotropic layer may further include an A plate and/or a C plate. In this case, if the optical anisotropic layer further includes the A plate, an optical axis of at least one of the A plate of the area for the left eye may be parallel to an optical axis of the B plate of the area for the left eye, and an optical axis of at least one of A plate of the area for the right eye may be parallel to an optical axis of the B plate of the area for the right eye. In other embodiment, at least one of the A plate of the area for the left eye and at least one of the A plate of the area for the right eye may have the optical axes formed in the same direction as each other, and the same direction of the optical axes may be preferably perpendicular to the light absorbing axis of the polarizer.

In the second type of the polarizing glasses, an optical axis of at least one of the A plate of the area for the left eye may have a different direction from an optical axis of at least one of the A plate of the area for the right eye. Preferably, a bisector of an angle formed by the optical axes of the at least one of the A plates in the area for the left eye and in the area for the right eye may be preferably perpendicular or parallel to the light absorbing axis of the polarizer of the polarizing glasses. In the above case, an angle formed by the optical axis of the at least one of the A plate of the area for the left eye and the optical axis of the at least one of the A plate of the area for the right eye may be 90 degrees.

In the first or second polarizing glasses, by combining specific kinds of optical anisotropic layers and adjusting a relation between the optical axes of the optical anisotropic layers and a relation between the optical axes of the optical anisotropic layers and the light absorbing axis of the polarizer, it becomes possible to observe the stereoscopic image with higher quality.

In one embodiment, the optical anisotropic layer of the first type of the polarizing glasses may include a first +B plate and a second +B plate, which are arranged sequentially from a side into which the image signal enters. In the above, an optical axis of the first +B plate of the area for the left eye may have a different direction from an optical axis of the first +B plate of the right eye. In the above, a bisector of an angle formed by the optical axes of the first +B plates of the area for the left eye and the area for the right eye may be perpendicular or parallel to the light absorbing axis of the polarizer of the polarizing glasses. In the above, an angle formed by the optical axes of the first +B plates of the area for the left eye and the area for the right eye may be 90 degrees. Also, optical axes of the second +B plates of the area for the left eye and the right eye plate may have the same direction, and the same direction of the optical axes may be perpendicular to the light absorbing axis of the polarizer of the polarizing glasses.

In one embodiment, the optical anisotropic layer of the first type of the polarizing glasses may include a −B plate and a +C plate, which are arranged sequentially from a side into which the image signal enters. In the above, an optical axis of the −B plate of the area for the left eye may have a different direction from an optical axis of the −B plate of the right eye. In the above, a bisector of an angle formed by the optical axes of the −B plates of the area for the left eye and the area for the right eye may be perpendicular or parallel to the light absorbing axis of the polarizer of the polarizing glasses. In the above, an angle formed by the optical axes of the −B plates of the area for the left eye and the area for the right eye may be 90 degree.

In another embodiment, the optical anisotropic layer of the first type of the polarizing glasses may include a −C plate and a +B plate, which are arranged sequentially from a side into which the image signal enters. In the above, an optical axis of the +B plate of the area for the left eye may have a different direction from an optical axis of the +B plate of the right eye. In the above, a bisector of an angle formed by the optical axes of the +B plates of the area for the left eye and the area for the right eye may be perpendicular or parallel to the light absorbing axis of the polarizer of the polarizing glasses. In the above, an angle formed by the optical axes of the +B plates of the area for the left eye and the area for the right eye may be 90 degree.

In still another embodiment, the optical anisotropic layer of the first type of the polarizing glasses may include a +A plate and a +B plate, which are arranged sequentially from a side into which the image signal enters. In the above, an optical axis of the +B plate of the area for the left eye may have a different direction from an optical axis of the +B plate of the right eye. In the above, a bisector of an angle formed by the optical axes of the +B plates of the area for the left eye and the area for the right eye may be perpendicular or parallel to the light absorbing axis of the polarizer of the polarizing glasses. In the above, an angle formed by the optical axes of the +B plates of the area for the left eye and the area for the right eye may be 90 degree. Also, an optical axis of the +A plate in the area for the left eye may be parallel to the optical axis of the +B plate in the area for the left eye, and an optical axis of the +A plate in the area for the right eye may be parallel to the optical axis of the +B plate in the area for the right eye.

In still another embodiment, the optical anisotropic layer of the first type of the polarizing glasses may include a +B plate and a +A plate, which are arranged sequentially from a side into which the image signal enters. In the above, an optical axis of the +B plate of the area for the left eye may have a different direction from an optical axis of the +B plate of the right eye. In the above, a bisector of an angle formed by the optical axes of the +B plates of the area for the left eye and the area for the right eye may be perpendicular or parallel to the light absorbing axis of the polarizer of the polarizing glasses. In the above, an angle formed by the optical axes of the +B plates of the area for the left eye and the area for the right eye may be 90 degree. Also, an optical axis of the +A plate in the area for the left eye may have the same direction as an optical axis of the +A plate in the area for the right eye, and the same direction may be perpendicular to a light absorbing axis of the polarizer.

In still another embodiment, the optical anisotropic layer of the first type of the polarizing glasses may include a −C plate, a +B plate, and a +A plate, which are arranged sequentially from a side into which the image signal enters. In the above, an optical axis of the +B plate of the area for the left eye may have a different direction from an optical axis of the +B plate of the right eye. In the above, a bisector of an angle formed by the optical axes of the +B plates of the area for the left eye and the area for the right eye may be perpendicular or parallel to the light absorbing axis of the polarizer of the polarizing glasses. In the above, an angle formed by the optical axes of the +B plates of the area for the left eye and the area for the right eye may be 90 degree. Also, an optical axis of the +A plate in the area for the left eye may have the same direction as an optical axis of the +A plate in the area for the right eye, and the same direction may be perpendicular to a light absorbing axis of the polarizer.

In still another embodiment, the optical anisotropic layer of the first type may include a first +A plate, a +B plate, and a second +A plate, which are arranged sequentially from a side into which the image signal enters. In the above, an optical axis of the +B plate of the area for the left eye may have a different direction from an optical axis of the +B plate of the right eye. In the above, a bisector of an angle formed by the optical axes of the +B plates of the area for the left eye and the area for the right eye may be perpendicular or parallel to the light absorbing axis of the polarizer of the polarizing glasses. In the above, an angle formed by the optical axes of the +B plates of the area for the left eye and the area for the right eye may be 90 degree. Also, an optical axis of the first +A plate in the area for the left eye may have the same direction as the optical axis of the +B plate in the area for the left eye, and an optical axis of the first +A plate in the area for the right eye may have the same direction as the optical axis of the +B plate in the area for the right eye. Also, an optical axis of the second +A plate in the area for the left eye may have the same direction as an optical axis of the second +A plate in the area for the right eye, and the same direction may be perpendicular to a light absorbing axis of the polarizer.

In still another embodiment, the optical anisotropic layer of the first type of the polarizing glasses may include a +B plate, a +C plate, and a +A plate, which are arranged sequentially from a side into which the image signal enters. In the above, an optical axis of the +B plate of the area for the left eye may have a different direction from an optical axis of the +B plate of the right eye. In the above, a bisector of an angle formed by the optical axes of the +B plates of the area for the left eye and the area for the right eye may be perpendicular or parallel to the light absorbing axis of the polarizer of the polarizing glasses. In the above, an angle formed by the optical axes of the +B plates of the area for the left eye and the area for the right eye may be 90 degree. Also, an optical axis of the +A plate in the area for the left eye may have the same direction as an optical axis of the +A plate in the area for the right eye, and the same direction may be perpendicular to a light absorbing axis of the polarizer.

In one embodiment, the optical anisotropic layer of the second type of the polarizing glasses may include a first +A plate, a +C plate, and a second +A plate, which are arranged sequentially from a side into which the image signal enters; or may include a first +C plate, a first +A plate, a second +C plate, and a second +A plate, which are arranged sequentially from a side into which the image signal enters. In the above, an optical axis of the first +A plate of the area for the left eye may have a different direction from an optical axis of the first +A plate of the right eye. In the above, a bisector of an angle formed by the optical axes of the first +A plates of the area for the left eye and the area for the right eye may be perpendicular or parallel to the light absorbing axis of the polarizer of the polarizing glasses. In the above, an angle formed by the optical axes of the first +A plates of the area for the left eye and the area for the right eye may be 90 degree. Also, an optical axis of the second +A plate in the area for the left eye may have the same direction as an optical axis of the second +A plate in the area for the right eye, and the same direction may be perpendicular to a light absorbing axis of the polarizer.

The above described combinations of the optical anisotropic films and the above described arrangements of the optical axes may be preferable for observing the stereoscopic image, particularly, the stereoscopic image including the left-circularly polarized light and the right-circularly polarized light. In one embodiment, the stereoscopic image may be an image emitted from the above described exemplary stereoscopic image display device. The stereoscopic image display device may includes the stereoscopic image generating unit that is capable of generating the left eye signal and the right eye signal and then is capable of transferring the left eye signal and the right eye signal to an observer side in the driven state, and that includes the first polarizing plate, the image generating element, and the second polarizing plate, which are sequentially arranged; and the polarization adjusting layer that includes at least one polarization adjusting area for the left eye signal and at least one polarization adjusting area for the right eye signal, which are capable of receiving the image signals transferred from the image generating unit, and then capable of transferring the signals toward the observer side after adjusting them so that the left eye signal and the right eye signal have different polarized states from each other. In the above, both of the polarization adjusting area for the left eye signal and the polarization adjusting area for the right eye signal may include a $\lambda/4$ plate, and an optical axis of the $\lambda/4$ plate in the polarization adjusting area for the left eye signal may have a different direction from an optical axis of the $\lambda/4$ plate in the polarization adjusting area for the right eye signal.

In the above, the $\lambda/4$ plate may have a retardation in the range from 110 nm to 150 nm with respect to light having the wavelength of 550 nm.

A kind of the polarizer in the polarizing glasses is not particularly limited. In one embodiment, a polarizer used in the polarizing plate as described in the above stereoscopic image display device may be used.

In one embodiment, a light absorbing axis of the polarizer in the area for the left eye of the polarizing glasses may have the same direction as a light absorbing axis of the polarizer in the area for the right eye of the polarizing glasses. Also, in one embodiment, when arranging the polarizing glasses so that an imaginary line connecting centers of the areas for the left eye and for the right eye of the polarizing glasses is parallel to a light absorbing axis of the second polarizing plate in the stereoscopic image display device, the light absorbing axes of the polarizers in the areas for the left eye and for the right eye of the polarizing glasses, which are formed in the same direction, may be perpendicular to the light absorbing axis of the second polarizing plate in the stereoscopic image display device. The term "imaginary line connecting centers of the areas for the left eye and for the right eye of the polarizing glasses" as used herein may refer to an imaginary line CL connecting central portions C of the area for the left eye GR and the area for the right eye GL as illustrated in FIG. 8. The term "centers of the areas or central portions of the areas" as used herein may refer to a center of gravity.

The polarizers of the area for the left eye and the area for the right eye which are arranged in the above position may make it possible to observe the stereoscopic image with more excellent quality with the above described optical anisotropic layer.

In case where the polarizing glasses is used to observe the image signal including the left-circularly polarized light and the right-circularly polarized light, or in case where the polarizing glasses is used to observe the image signal emitted from the stereoscopic image display device including the polarization adjusting element having the λ/4 plates having the optical axes having different directions, each of the area for the left eye and the area for the right eye of the polarizing glasses may further include a λ/4 plate. In one embodiment, the λ/4 plate may be arranged between the optical anisotropic layer and the polarizer of the polarizing glasses. In the above structure, when the polarizing glasses are arranged such that the imaginary line connecting the centers of the areas for the left eye and for the right eye of the polarizing glasses can be parallel to the light absorbing axis of the second polarizing plate of the stereoscopic image display device, the optical axis of the λ/4 plate in the area for the left eye of the polarizing glasses may be formed in a direction parallel to the optical axis of the λ/4 plate of the polarization adjusting area for the left eye signal of the polarization adjusting element, and the optical axis of the λ/4 plate in the area for the right eye of the polarizing glasses may be formed in a direction parallel to the optical axis of the λ/4 plate of the polarization adjusting area for the right eye signal of the polarization adjusting element. However, the λ/4 plate may be optionally included, and according to circumstances, by only appropriately using the A, B, and C plates in the optical anisotropic layer, the stereoscopic image including the left-circularly polarized light and the right-circularly polarized light can be observed without the λ/4 plate.

The present invention also relates to a stereoscopic image display device. One exemplary stereoscopic image display device may include an image generating unit; a polarization adjusting element; and an optical anisotropic layer. The image generating unit may generate an image signal including a right eye signal and a left eye signal and then transfer the generated signal toward an observer side in the driven state. The polarization adjusting element may receive the image signal transferred from the image generating unit, and then transfer the left eye signal and the right eye signal having the different polarized states from each other to the observer side after adjusting them so that the left eye signal and the right eye signal can have different polarized states from each other. The optical anisotropic layer may receive the image signal transferred from the polarization adjusting element, pass the signal through itself along with its thickness direction and then transfer the signal toward the observer side. The optical anisotropic layer includes at least one optical anisotropic film, and has the value calculated as in the Formula 1 in the range from 50 nm to 500 nm, and the value calculated as in the Formula 2 in the range from 0.1 to 3.

FIG. 9 shows a schematic of an illustrative embodiment of the above exemplary stereoscopic image display device 10. In the device 10 in FIG. 9, the optical anisotropic layer 101 is attached on the front surface of the polarization adjusting element 15 of the stereoscopic image display device in FIG. 1.

The details of the stereoscopic image display device have been described above, and the above description may be similarly applied except that the optical anisotropic layer, which was arranged in the polarizing glasses, is arranged inside the stereoscopic image display device. For example, the description with respect to the optical axis of the optical anisotropic layer in the area for the left eye of the polarizing glasses may be similarly applied to an area 101L of the optical anisotropic layer through which the left eye signal after passing through the polarization adjusting element in the stereoscopic image display device passes through, and the description with respect to the optical axis of the optical anisotropic layer in the area for the right eye of the polarizing glasses may be similarly applied to an area 101R of the optical anisotropic layer through which the right eye signal after passing through the polarization adjusting element in the stereoscopic image display device passes through. Further, the description of the relation between the optical axis of the optical anisotropic layer and the light absorbing axis of the polarizer in the polarizing glasses may be similarly applied under the state in which polarizing glasses for observing the image signal emitted from the stereoscopic image display device are arranged so that a imaginary line connecting centers of the areas for the left eye and for the right eye of the polarizing glasses can be parallel to a light absorbing axis of the second polarizing plate in the stereoscopic image display device.

The image signal emitted from the stereoscopic image display device may be observed after wearing glasses for observing the stereoscopic image that include the areas for the left eye and for the right eye, each of which includes a polarizer. Light absorbing axes of the polarizers included in the area for the left eye and the area for the right eye may be formed in the same direction. Also, the light absorbing axes formed in the same direction in the polarizers of the area for the left eye and the area for the right eye may be perpendicular to the light absorbing axis of the second polarizing plate under the state in which the glasses are arranged so that an imaginary line connecting centers of the areas for the left eye and for the right eye of the polarizing glasses may be parallel to the light absorbing axis of the second polarizing plate of the stereoscopic image display device.

Further, as described above, the image signal emitted from the stereoscopic image display device may preferably include the left-circularly polarized light and the right-circularly polarized light. Therefore, in the area for the left eye and the area for the right eye of the polarization adjusting element, the λ/4 plates having the optical axes formed in a different direction from each other may be arranged, or the 3λ/4 plate and the λ/4 plate may be arranged.

BRIEF DESCRIPTION OF THE DRAWINGS

FIG. 1 shows a cross-sectional schematic of an illustrative embodiment of the exemplary stereoscopic image display device;

FIGS. 2 and 3 show schematics of illustrative embodiments of arrangements of the right eye signal generating area and the left eye signal generating area in the stereoscopic image display device;

FIGS. 4 and 5 show schematics of illustrative embodiments of arrangements of the polarization adjusting area for the left eye signal and the polarization adjusting area for the right eye signal in the polarization adjusting layer;

FIGS. 6 and 8 show schematics of illustrative embodiments of the polarizing glasses;

FIG. 8 exemplarily illustrates polarizing glasses;

DETAILED DESCRIPTION OF EXEMPLARY EMBODIMENTS

Hereinafter, examples of the present invention will be described in detail together with a comparative example, but the scope of the present invention is not limited to the following examples.

In this document, physical properties was evaluated by the following methods.

1. Retardations of Optical Anisotropic Layers or Films

The values calculated by the Formulas 1 and 2 were determined by evaluating the in-plane retardation ($R_{in}$) with respect to light having the wavelength of 550 nm and the retardation in a thickness direction ($R_{th}$) with respect to light having the wavelength of 550 nm of an optical anisotropic layer or film respectively, and then considering the evaluated in-plane retardation ($R_{in}$) as the value calculated by the Formula 1, and considering the ratio ($R_{in}/R_{th}$) of the evaluated in-plane retardation ($R_{in}$) with respect to the evaluated retardation in a thickness direction ($R_{th}$) as the value calculated by the Formula 2. The in-plane retardation ($R_{in}$) and the retardation in a thickness direction ($R_{th}$) were extracted from 16 Mueller matrices of the optical anisotropic layer or film which were measured by using Axoscan which is equipment capable of measuring 16 Mueller matrices and is available from Axometrics, Inc. according to the manufacturer's manual. If two or more optical anisotropic films were used, the values calculated by the Formulas 1 and 2 were determined by measuring separately the in-plane retardation and the retardation in a thickness direction of each film, and then using the sum of the in-plane retardations as the in-plane retardation of the entire optical anisotropic layer, and using the sum of the retardations in a thickness direction as the retardation in a thickness direction of the entire optical anisotropic layer.

2. Method of Evaluating Viewing Angle Characteristic

In examples and a comparative example, the viewing angle characteristic when a stereoscopic image was observed was simulated using a display modeling system (DIMOS) of Autronic-Melchers Gmbh. In the above simulation, an azimuthal angle was set to 0 to 360 degrees, and a polar angle was set to 0 to 80 degrees. The results are illustrated in FIGS. 10 to 20.

Example 1

Figures 5, 6:
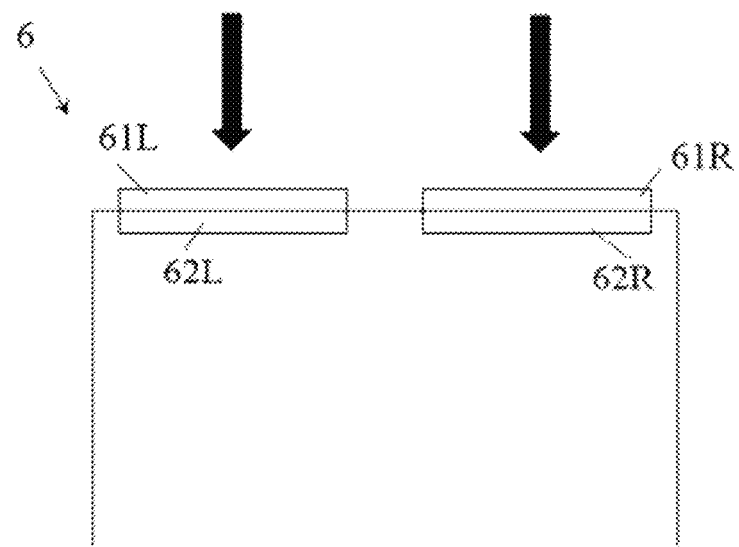
Figure 7:
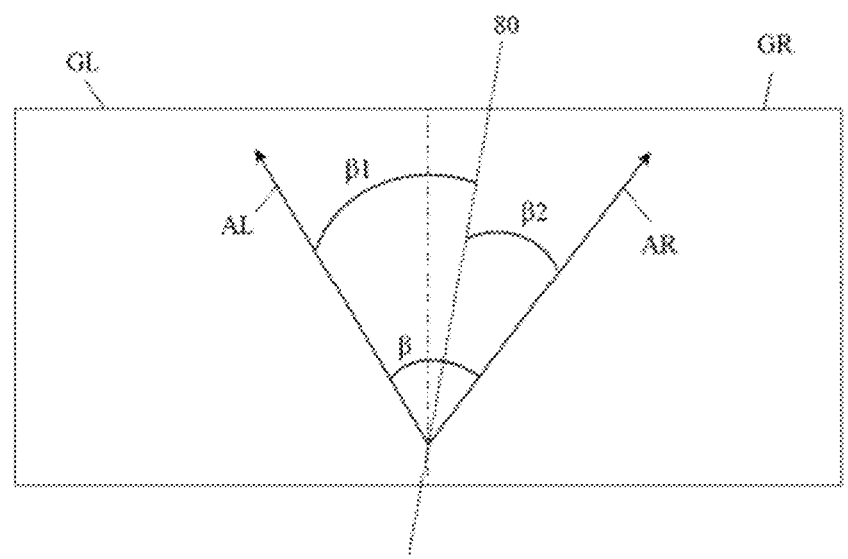
FIG. 7 show a schematic of an illustrative embodiment of the bisector of optical axes.
Figure 8:
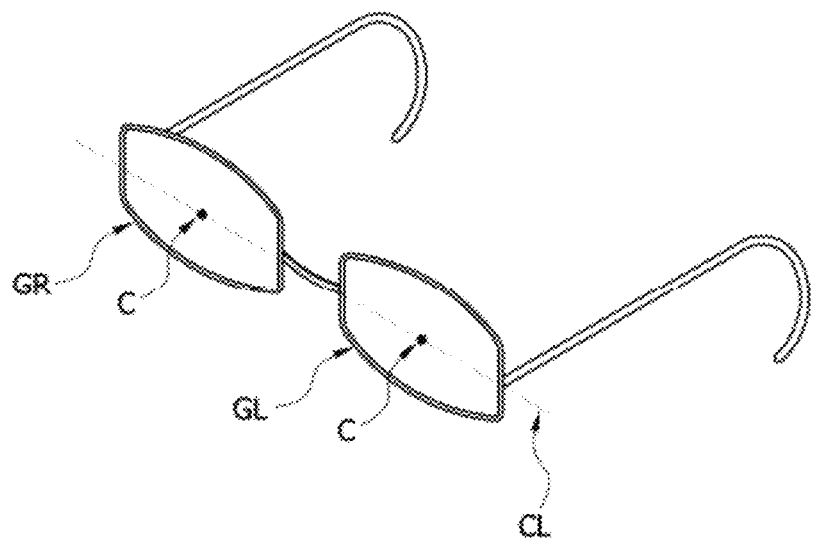

The viewing angle characteristic was evaluated by observing the stereoscopic image emitted from the stereoscopic image display device having the structure in FIG. 1, in which the λ/4 plates were arranged on both of the area for the right eye and the area for the left eye of the polarization adjusting element 15, with wearing the polarizing glasses having the structure in FIG. 6. In the above, an optical axis of the λ/4 plate in the area for the right eye of the polarization adjusting element 15 formed an angle of 45 degrees clockwise from the light absorbing axis of the second polarizing plate 14, and an optical axis of the λ/4 plate in the area for the left eye of the polarization adjusting element 15 was formed to be perpendicular to the optical axis of the λ/4 plate in the area for the right eye of the polarization adjusting element 15. Polarizers 62L and 62R in the area for the left eye and the area for the right eye of the polarizing glasses had light absorbing axes formed in the same direction, and the same direction of the light absorbing axes of the polarizers 62L and 62R were arranged so that the same direction of the light absorbing axes of the polarizers 62L and 62R could be perpendicular to the light absorbing axis of the second polarizing plate 14 under the state in which the imaginary line connecting centers of the areas for the left eye and for the right eye of the polarizing glasses was parallel to the light absorbing axis of the second polarizing plate 14 of the stereoscopic image display device. Optical anisotropic layers 61L and 61R of the polarizing glasses were formed by attaching a +C plate having the retardation in a thickness direction of 140 nm on the polarizers 62L and 62R respectively, and then attaching a −B plate having the in-plane retardation of 125 nm and the retardation in a thickness direction of −38 nm on the +C plates respectively. In the above, the optical axis of the −B plate in the area for the right eye formed an angle of 45 degrees clockwise from the light absorbing axis of the second polarizing plate 14, and the optical axis of the −B plate in the area for the left eye formed an angle of 45 degrees counterclockwise from the light absorbing axis of the second polarizing plate 14. A film which was a conventional liquid crystal type film and was prepared using photo-curable vertically aligned liquid crystal compound was used as the +C plate, and a COP polymer film was used as the −B plate. In the polarizing glasses, details of the polarizer and the optical anisotropic layer, which were sequentially arranged from a side into which an image signal entered, is shown in Table 1.

TABLE 1

| | Angle (degrees) | | Retardation (nm) | | | | I (nm) | | I/T | |
|---|---|---|---|---|---|---|---|---|---|---|
| | | | $R_{in}$ | | $R_{th}$ | | | | | |
| | R | L | R | L | R | L | R | L | R | L |
| −B Plate | 45 | −45 | 125 | 125 | −38 | −38 | 125 | 125 | About 1.23 | about 1.23 |
| +C Plate | — | — | — | — | 140 | 140 | | | | |
| Polarizer | 90 | 90 | — | — | — | — | — | — | — | — |

Angles: an angle of the optical axis of the optical anisotropic film or the light absorbing axis of the polarizer (the angles were measured from the light absorbing axis of the second polarizing plate in the stereoscopic image display device; an angle measured clockwise from the light absorbing axis of the second polarizing plate in the device is marked as positive value; an angle measured counterclockwise is marked as negative value; and the measurement was performed in the state in which the polarizing glasses were arranged so that the imaginary line connecting centers of the areas for the left eye and for the right eye of the polarizing glasses can be parallel to the light absorbing axis of the second polarizing plate of the device).
$R_{in}$: the in-plane retardation of the optical anisotropic film
$R_{th}$: the retardation in a thickness direction of the optical anisotropic film
I: the in-plane retardation of the optical anisotropic layer calculated as in the Formula 1
I/T: the ratio of the in-plane retardation to retardation in a thickness direction of the optical anisotropic layer, calculated as in the Formula 2
R: information of the optical anisotropic film or the polarizer in the area for the right eye
L: information of the optical anisotropic film or the polarizer in the area for the left eye

Example 2

The viewing angle characteristic was evaluated by the same method as described in Example 1, except that optical anisotropic layers 61L and 61R of the polarizing glasses were formed by attaching a +B plate having the retardation in a thickness direction of 190 nm and the in-plane retardation of 125 nm on the polarizers 62L and 62R respectively, and then attaching a −C plate having the retardation in a thickness direction of −40 nm on the +B plates respectively. In the above, the optical axis of the +B plate in the area for the right eye formed an angle of 45 degrees clockwise from the light absorbing axis of the second polarizing plate 14, and the optical axis of the +B plate in the area for the left eye formed an angle of 45 degrees counterclockwise from the light absorbing axis of the second polarizing plate 14. A film which was a conventional liquid crystal type film and was prepared using photo-curable vertically aligned liquid crystal compound was used as the +C plate, and a polyacrylate film was used as the +B plate. In the polarizing glasses, details of the polarizer and the optical anisotropic layer, which were sequentially arranged from a side into which an image signal entered, is shown in Table 2.

TABLE 2

| | Angle (degrees) | | Retardation (nm) | | | | I (nm) | | I/T | |
|---|---|---|---|---|---|---|---|---|---|---|
| | | | $R_{in}$ | | $R_{th}$ | | | | | |
| | R | L | R | L | R | L | R | L | R | L |
| −C Plate | — | — | — | — | −40 | −40 | 125 | 125 | About 0.83 | About 0.83 |
| +B Plate | 45 | −45 | 125 | 125 | 190 | 190 | | | | |
| Polarizer | 90 | 90 | — | — | — | — | — | — | — | — |

Angles: an angle of the optical axis of the optical anisotropic film or the light absorbing axis of the polarizer (the angles were measured from the light absorbing axis of the second polarizing plate in the stereoscopic image display device; an angle measured clockwise from the light absorbing axis of the second polarizing plate in the device is marked as positive value; an angle measured counterclockwise is marked as negative value; and the measurement was performed in the state in which the polarizing glasses were arranged so that the imaginary line connecting centers of the areas for the left eye and for the right eye of the polarizing glasses can be parallel to the light absorbing axis of the second polarizing plate of the device).
$R_{in}$: the in-plane retardation of the optical anisotropic film
$R_{th}$: the retardation in a thickness direction of the optical anisotropic film
I: the in-plane retardation of the optical anisotropic layer calculated as in the Formula 1
I/T: the ratio of the in-plane retardation to retardation in a thickness direction of the optical anisotropic layer, calculated as in the Formula 2
R: information of the optical anisotropic film or the polarizer in the area for the right eye
L: information of the optical anisotropic film or the polarizer in the area for the left eye

Example 3

The viewing angle characteristic was evaluated by the same method as described in Example 1, except that optical anisotropic layers 61L and 61R of the polarizing glasses were formed by attaching a +B plate having the retardation in a thickness direction of 140 nm and the in-plane retardation of 90 nm on the polarizers 62L and 62R respectively, and then attaching a +A plate having the in-plane retardation of 35 nm on the +B plates respectively. In the above, the optical axes of the +B plate and the +A plate in the area for the right eye formed an angle of 45 degrees clockwise from the light absorbing axis of the second polarizing plate 14, and the optical axes of the +B plate and the +A plate in the area for the left eye formed an angle of 45 degrees counterclockwise from the light absorbing axis of the second polarizing plate 14. A polymer film including polyacrylate was used as the +B plate, and a polymer film including polycarbonate was used as the +A plate. In the polarizing glasses, details of the polarizer and the optical anisotropic layer, which were sequentially arranged from a side into which an image signal entered, is shown in Table 3.

TABLE 3

| | Angle (degrees) | | Retardation (nm) | | | | I (nm) | | I/T | |
|---|---|---|---|---|---|---|---|---|---|---|
| | | | $R_{in}$ | | $R_{th}$ | | | | | |
| | R | L | R | L | R | L | R | L | R | L |
| +A Plate | 45 | −45 | 35 | 35 | — | — | 125 | 125 | About 0.89 | About 0.89 |
| +B Plate | 45 | −45 | 90 | 90 | 140 | 140 | | | | |
| Polarizer | 90 | 90 | — | — | — | — | — | — | — | — |

Angles: an angle of the optical axis of the optical anisotropic film or the light absorbing axis of the polarizer (the angles were measured from the light absorbing axis of the second polarizing plate in the stereoscopic image display device; an angle measured clockwise from the light absorbing axis of the second polarizing plate in the device is marked as positive value; an angle measured counterclockwise is marked as negative value; and the measurement was performed in the state in which the polarizing glasses were arranged so that the imaginary line connecting centers of the areas for the left eye and for the right eye of the polarizing glasses can be parallel to the light absorbing axis of the second polarizing plate of the device).
$R_{in}$: the in-plane retardation of the optical anisotropic film
$R_{th}$: the retardation in a thickness direction of the optical anisotropic film
I: the in-plane retardation of the optical anisotropic layer calculated as in the Formula 1
I/T: the ratio of the in-plane retardation to retardation in a thickness direction of the optical anisotropic layer, calculated as in the Formula 2
R: information of the optical anisotropic film or the polarizer in the area for the right eye
L: information of the optical anisotropic film or the polarizer in the area for the left eye

Example 4

The viewing angle characteristic was evaluated by the same method as described in Example 1, except that optical anisotropic layers 61L and 61R of the polarizing glasses were formed by attaching a +A plate having the in-plane retardation of 150 nm on the polarizers 62L and 62R respectively, attaching a +C plate having the retardation in a thickness direction of 150 nm on the +A plates respectively, and then attaching a +A plate having the in-plane retardation of 125 nm on the +C plates respectively. In the above, the optical axis of the +A plate having the in-plane retardation of 125 nm in the area for the right eye formed an angle of 45 degrees clockwise from the light absorbing axis of the second polarizing plate 14, the optical axis of the +A plate having the in-plane retardation of 150 nm in the area for the right eye was formed in a direction parallel to the light absorbing axis of the second polarizing plate 14, the optical axis of the +A plate having the in-plane retardation of 125 nm in the area for the left eye formed an angle of 45 degrees counterclockwise from the light absorbing axis of the second polarizing plate 14, and the optical axis of the +A plate having the in-plane retardation of 150 nm in the area for the left eye was formed in a direction parallel to the light absorbing axis of the second polarizing plate 14. A polymer film including polycarbonate was used as the +A plate, and a film prepared using photo-curable vertically aligned liquid crystal compound was used as the +C plate. In the polarizing glasses, details of the polarizer and the optical anisotropic layer, which were sequentially arranged from a side into which an image signal entered, is shown in Table 4.

Example 5

The viewing angle characteristic was evaluated by the same method as described in Example 1, except that optical anisotropic layers 61L and 61R of the polarizing glasses were formed by attaching a +A plate having the in-plane retardation of 140 nm on the polarizers 62L and 62R respectively, and then attaching a +B plate having the retardation in a thickness direction of 200 nm and the in-plane retardation of 125 nm on the +A plates respectively. In the above, the optical axis of the +B plate the area for the right eye formed an angle of 45 degrees clockwise from the light absorbing axis of the second polarizing plate 14, the optical axis of the +A plate the area for the right eye was formed in a direction parallel to the light absorbing axis of the second polarizing plate 14, the optical axis of the +B plate the area for the left eye formed an angle of 45 degrees counterclockwise from the light absorbing axis of the second polarizing plate 14, and the optical axis of the +A plate the area for the left eye was formed in a direction parallel to the light absorbing axis of the second polarizing plate 14. A polymer film including polycarbonate was used as the +A plate, and a polymer film including polyacrylate was used as the +B plate. In the polarizing glasses, details of the polarizer and the optical anisotropic layer, which were sequentially arranged from a side into which an image signal entered, is shown in Table 5.

TABLE 4

| | Angle (degrees) | | Retardation (nm) | | | | I (nm) | | I/T | |
|---|---|---|---|---|---|---|---|---|---|---|
| | | | $R_{in}$ | | $R_{th}$ | | | | | |
| | R | L | R | L | R | L | R | L | R | L |
| +A Plate | 45 | −45 | 125 | 125 | — | — | 275 | 275 | About 1.83 | About 1.83 |
| +C Plate | — | — | — | — | 150 | 150 | | | | |
| +A Plate | 0 | 0 | 150 | 150 | — | — | | | | |
| Polarizer | 90 | 90 | — | — | — | — | — | — | — | — |

Angles: an angle of the optical axis of the optical anisotropic film or the light absorbing axis of the polarizer (the angles were measured from the light absorbing axis of the second polarizing plate in the stereoscopic image display device; an angle measured clockwise from the light absorbing axis of the second polarizing plate in the device is marked as positive value; an angle measured counterclockwise is marked as negative value; and the measurement was performed in the state in which the polarizing glasses were arranged so that the imaginary line connecting centers of the areas for the left eye and for the right eye of the polarizing glasses can be parallel to the light absorbing axis of the second polarizing plate of the device).

$R_{in}$: the in-plane retardation of the optical anisotropic film $R_{th}$: the retardation in a thickness direction of the optical anisotropic film I: the in-plane retardation of the optical anisotropic layer calculated as in the Formula 1

I/T: the ratio of the in-plane retardation to retardation in a thickness direction of the optical anisotropic layer, calculated as in the Formula 2

R: information of the optical anisotropic film or the polarizer in the area for the right eye L: information of the optical anisotropic film or the polarizer in the area for the left eye

TABLE 5

| | Angle (degrees) | | Retardation (nm) | | | | I (nm) | | I/T | |
|---|---|---|---|---|---|---|---|---|---|---|
| | | | $R_{in}$ | | $R_{th}$ | | | | | |
| | R | L | R | L | R | L | R | L | R | L |
| +B Plate | 45 | −45 | 125 | 125 | 200 | 200 | 265 | 265 | About 1.33 | About 1.33 |
| +A Plate | 0 | 0 | 140 | 140 | — | — | | | | |
| Polarizer | 90 | 90 | — | — | — | — | — | — | — | — |

Angles: an angle of the optical axis of the optical anisotropic film or the light absorbing axis of the polarizer (the angles were measured from the light absorbing axis of the second polarizing plate in the stereoscopic image display device; an angle measured clockwise from the light absorbing axis of the second polarizing plate in the device is marked as positive value; an angle measured counterclockwise is marked as negative value; and the measurement was performed in the state in which the polarizing glasses were arranged so that the imaginary line connecting centers of the areas for the left eye and for the right eye of the polarizing glasses can be parallel to the light absorbing axis of the second polarizing plate of the device).
$R_{in}$: the in-plane retardation of the optical anisotropic film
$R_{th}$: the retardation in a thickness direction of the optical anisotropic film
I: the in-plane retardation of the optical anisotropic layer calculated as in the Formula 1
I/T: the ratio of the in-plane retardation to retardation in a thickness direction of the optical anisotropic layer, calculated as in the Formula 2
R: information of the optical anisotropic film or the polarizer in the area for the right eye
L: information of the optical anisotropic film or the polarizer in the area for the left eye Example 6

The viewing angle characteristic was evaluated by the same method as described in Example 1, except that optical anisotropic layers 61L and 61R of the polarizing glasses were formed by attaching a +A plate having the in-plane retardation of 140 nm on the polarizers 62L and 62R respectively, attaching a +C plate having the retardation in a thickness direction of 150 nm on the +A plate, attaching a +A plate having the in-plane retardation of 125 nm on the +C plates, and then attaching a +C plate having the retardation in a thickness direction of 90 nm respectively. In the above, the optical axis of the +A plate having the in-plane retardation of 125 nm on the area for the right eye formed an angle of 45 degrees clockwise from the light absorbing axis of the second polarizing plate 14, the optical axis of the +A plate having the in-plane retardation of 140 nm on the area for the right eye was formed in a direction parallel to the light absorbing axis of the second polarizing plate 14, the optical axis of the +A plate having the in-plane retardation of 125 nm on the area for the left eye formed an angle of 45 degrees counterclockwise from the light absorbing axis of the second polarizing plate 14, and the optical axis of the +A plate having the in-plane retardation of 140 nm on the area for the left eye was formed in a direction parallel to the light absorbing axis of the second polarizing plate 14. A polymer film including polycarbonate was used as the +A plate, and a film prepared using photo-curable vertically aligned liquid crystal compound was used as the +C plate. In the polarizing glasses, details of the polarizer and the optical anisotropic layer, which were sequentially arranged from a side into which an image signal entered, is shown in Table 6.

TABLE 6

| | Angle (degrees) | | Retardation (nm) | | | | I (nm) | | I/T | |
|---|---|---|---|---|---|---|---|---|---|---|
| | | | $R_{in}$ | | $R_{th}$ | | | | | |
| | R | L | R | L | R | L | R | L | R | L |
| +C Plate | — | — | — | — | 90 | 90 | 265 | 265 | About 1.10 | About 1.10 |
| +A Plate | 45 | −45 | 125 | 125 | — | — | | | | |
| +C Plate | — | — | — | — | 150 | 150 | | | | |
| +A Plate | 0 | 0 | 140 | 140 | — | — | | | | |
| Polarizer | 90 | 90 | — | — | — | — | — | — | — | — |

Angles: an angle of the optical axis of the optical anisotropic film or the light absorbing axis of the polarizer (the angles were measured from the light absorbing axis of the second polarizing plate in the stereoscopic image display device; an angle measured clockwise from the light absorbing axis of the second polarizing plate in the device is marked as positive value; an angle measured counterclockwise is marked as negative value; and the measurement was performed in the state in which the polarizing glasses were arranged so that the imaginary line connecting centers of the areas for the left eye and for the right eye of the polarizing glasses can be parallel to the light absorbing axis of the second polarizing plate of the device).
$R_{in}$: the in-plane retardation of the optical anisotropic film
$R_{th}$: the retardation in a thickness direction of the optical anisotropic film
I: the in-plane retardation of the optical anisotropic layer calculated as in the Formula 1
I/T: the ratio of the in-plane retardation to retardation in a thickness direction of the optical anisotropic layer, calculated as in the Formula 2
R: information of the optical anisotropic film or the polarizer in the area for the right eye
L: information of the optical anisotropic film or the polarizer in the area for the left eye Example 7

The viewing angle characteristic was evaluated by the same method as described in Example 1, except that optical anisotropic layers 61L and 61R of the polarizing glasses were formed by attaching a +A plate having the in-plane retardation of 150 nm on the polarizers 62L and 62R respectively, attaching a +B plate having the retardation in a thickness direction of 230 nm and the in-plane retardation of 125 nm on the +A plates, and then attaching a −C plate having the RTN of −40 nm on the +B plates respectively. In the above, the optical axis of the +B plate on the area for the right eye formed an angle of 45 degrees clockwise from the light absorbing axis of the second polarizing plate 14, the optical axis of the +A plate on the area for the right eye was formed in a direction parallel to the light absorbing axis of the second polarizing plate 14, the optical axis of the +B plate on the area for the left eye formed an angle of 45 degrees counterclockwise from the light absorbing axis of the second polarizing plate 14, and the optical axis of the +A plate on the area for the left eye was formed in a direction parallel to the light absorbing axis of the second polarizing plate 14. A polymer film including polycarbonate was used as the +A plate, a TAC (Triacetyl cellulose) film was used as the −C plates, and a polymer film including polyacrylate was used as the +B plate. In the polarizing glasses, details of the polarizer and the optical anisotropic layer, which were sequentially arranged from a side into which an image signal entered, is shown in Table 7.

90 nm on the +A plates, and then attaching a +A plate having the in-plane retardation of 35 nm on the +B plates respectively. In the above, the optical axes of the +B plate and the +A plate having the in-plane retardation of 35 nm on the area for the right eye formed an angle of 45 degrees clockwise from the light absorbing axis of the second polarizing plate 14, the optical axis of the +A plate having the in-plane retardation of 140 nm on the area for the right eye was formed in a direction parallel to the light absorbing axis of the second polarizing plate 14, the optical axes of the +B plate and the +A plate having the in-plane retardation of 35 nm on the area for the left eye formed an angle of 45 degrees counterclockwise from the light absorbing axis of the second polarizing plate 14, and the optical axis of the +A plate

TABLE 7

| | Angle (degrees) | | Retardation (nm) | | | | I (nm) | | I/T | |
|---|---|---|---|---|---|---|---|---|---|---|
| | | | $R_{in}$ | | $R_{th}$ | | | | | |
| | R | L | R | L | R | L | R | L | R | L |
| −C Plate | — | — | — | — | −40 | −40 | 275 | 275 | About 1.45 | About 1.45 |
| +B Plate | 45 | −45 | 125 | 125 | 230 | 230 | | | | |
| +A Plate | 0 | 0 | 150 | 150 | — | — | | | | |
| Polarizer | 90 | 90 | — | — | — | — | — | — | — | — |

Angles: an angle of the optical axis of the optical anisotropic film or the light absorbing axis of the polarizer (the angles were measured from the light absorbing axis of the second polarizing plate in the stereoscopic image display device; an angle measured clockwise from the light absorbing axis of the second polarizing plate in the device is marked as positive value; an angle measured counterclockwise is marked as negative value; and the measurement was performed in the state in which the polarizing glasses were arranged so that the imaginary line connecting centers of the areas for the left eye and for the right eye of the polarizing glasses can be parallel to the light absorbing axis of the second polarizing plate of the device).
$R_{in}$: the in-plane retardation of the optical anisotropic film
$R_{th}$: the retardation in a thickness direction of the optical anisotropic film
I: the in-plane retardation of the optical anisotropic layer calculated as in the Formula 1
I/T: the ratio of the in-plane retardation to retardation in a thickness direction of the optical anisotropic layer, calculated as in the Formula 2
R: information of the optical anisotropic film or the polarizer in the area for the right eye
L: information of the optical anisotropic film or the polarizer in the area for the left eye Example 9

The viewing angle characteristic was evaluated by the same method as described in Example 1, except that optical anisotropic layers 61L and 61R of the polarizing glasses were formed by attaching a +A plate having the in-plane retardation of 140 nm on the polarizers 62L and 62R respectively, attaching a +B plate having the retardation in a thickness direction of 190 nm and the in-plane retardation of 90 nm on the +A plates, and then attaching a +A plate having the in-plane retardation of 35 nm on the +B plates respectively.

having the in-plane retardation of 140 nm on the area for the left eye was formed in a direction parallel to the light absorbing axis of the second polarizing plate 14. A polymer film including polycarbonate was used as the +A plate, and a polymer film including polyacrylate was used as the +B plate. In the polarizing glasses, details of the polarizer and the optical anisotropic layer, which were sequentially arranged from a side into which an image signal entered, is shown in Table 8.

TABLE 8

| | Angle (degrees) | | Retardation (nm) | | | | I (nm) | | I/T | |
|---|---|---|---|---|---|---|---|---|---|---|
| | | | $R_{in}$ | | $R_{th}$ | | | | | |
| | R | L | R | L | R | L | R | L | R | L |
| +A Plate | 45 | −45 | 35 | 35 | — | — | 265 | 265 | About 1.39 | About 1.39 |
| +B Plate | 45 | −45 | 90 | 90 | 190 | 190 | | | | |
| +A Plate | 0 | 0 | 140 | 140 | — | — | | | | |
| Polarizer | 90 | 90 | — | — | — | — | — | — | — | — |

Angles: an angle of the optical axis of the optical anisotropic film or the light absorbing axis of the polarizer (the angles were measured from the light absorbing axis of the second polarizing plate in the stereoscopic image display device; an angle measured clockwise from the light absorbing axis of the second polarizing plate in the device is marked as positive value; an angle measured counterclockwise is marked as negative value; and the measurement was performed in the state in which the polarizing glasses were arranged so that the imaginary line connecting centers of the areas for the left eye and for the right eye of the polarizing glasses can be parallel to the light absorbing axis of the second polarizing plate of the device).
$R_{in}$: the in-plane retardation of the optical anisotropic film
$R_{th}$: the retardation in a thickness direction of the optical anisotropic film
I: the in-plane retardation of the optical anisotropic layer calculated as in the Formula 1
I/T: the ratio of the in-plane retardation to retardation in a thickness direction of the optical anisotropic layer, calculated as in the Formula 2
R: information of the optical anisotropic film or the polarizer in the area for the right eye
L: information of the optical anisotropic film or the polarizer in the area for the left eye

Example 9

The viewing angle characteristic was evaluated by the same method as described in Example 1, except that optical anisotropic layers 61L and 61R of the polarizing glasses were formed by attaching a +A plate having the in-plane retardation of 140 nm on the polarizers 62L and 62R respectively, attaching a +C plate having the retardation in a thickness direction of 90 nm on the +A plates, and then attaching a +B plate having the in-plane retardation of 125 nm and the retardation in a thickness direction of 140 nm on the +C plates respectively. In the above, the optical axis of the +B plate on the area for the right eye formed an angle of 45 degrees clockwise from the light absorbing axis of the second polarizing plate 14, the optical axis of the +A plate on the area for the right eye was formed in a direction parallel to the light absorbing axis of the second polarizing plate 14, the optical axis of the +B plate on the area for the left eye formed an angle of 45 degrees counterclockwise from the light absorbing axis of the second polarizing plate 14, and the optical axis of the +A plate on the area for the left eye was formed in a direction parallel to the light absorbing axis of the second polarizing plate 14. A polymer film including polycarbonate was used as the +A plate, a film prepared using photo-curable vertically aligned liquid crystal compound was used as the +C plate and a polymer film including polyacrylate was used as the +B plate. In the polarizing glasses, details of the polarizer and the optical anisotropic layer, which were sequentially arranged from a side into which an image signal entered, is shown in Table 9.

Example 10

The viewing angle characteristic was evaluated by the same method as described in Example 1, except that optical anisotropic layers 61L and 61R of the polarizing glasses were formed by attaching a +B plate having the in-plane retardation of 275 nm and the retardation in a thickness direction of 140 nm on the polarizers 62L and 62R respectively, and then attaching a +B plate having the in-plane retardation of 125 nm and the retardation in a thickness direction of 140 nm on the +B plates respectively. In the above, the optical axis of the +B plate having the in-plane retardation of 125 nm on the area for the right eye formed an angle of 45 degrees clockwise from the light absorbing axis of the second polarizing plate 14, the optical axis of the +B plate having the in-plane retardation of 275 nm on the area for the right eye was formed in a direction parallel to the light absorbing axis of the second polarizing plate 14, the optical axis of the +B plate having the in-plane retardation of 125 nm on the area for the left eye formed an angle of 45 degrees counterclockwise from the light absorbing axis of the second polarizing plate 14, and the optical axis of the +B plate having the in-plane retardation of 275 nm on the area for the left eye was formed in a direction parallel to the light absorbing axis of the second polarizing plate 14. A polymer film including polyacrylate was used as the +B plate. In the polarizing glasses, details of the polarizer and the optical anisotropic layer, which were sequentially arranged from a side into which an image signal entered, is shown in Table 10.

TABLE 9

| | Angle (degrees) | | Retardation (nm) | | | | I (nm) | | I/T | |
|---|---|---|---|---|---|---|---|---|---|---|
| | | | $R_{in}$ | | $R_{th}$ | | | | | |
| | R | L | R | L | R | L | R | L | R | L |
| +B Plate | 45 | −45 | 125 | 125 | 140 | 140 | 265 | 265 | About 1.15 | About 1.15 |
| +C Plate | — | — | — | — | 90 | 90 | | | | |
| +A Plate | 0 | 0 | 140 | 140 | — | — | | | | |
| Polarizer | 90 | 90 | — | — | — | — | — | — | — | — |

Angles: an angle of the optical axis of the optical anisotropic film or the light absorbing axis of the polarizer (the angles were measured from the light absorbing axis of the second polarizing plate in the stereoscopic image display device; an angle measured clockwise from the light absorbing axis of the second polarizing plate in the device is marked as positive value; an angle measured counterclockwise is marked as negative value; and the measurement was performed in the state in which the polarizing glasses were arranged so that the imaginary line connecting centers of the areas for the left eye and for the right eye of the polarizing glasses can be parallel to the light absorbing axis of the second polarizing plate of the device).

$R_{in}$: the in-plane retardation of the optical anisotropic film $R_{th}$: the retardation in a thickness direction of the optical anisotropic film I: the in-plane retardation of the optical anisotropic layer calculated as in the Formula 1

I/T: the ratio of the in-plane retardation to retardation in a thickness direction of the optical anisotropic layer, calculated as in the Formula 2

R: information of the optical anisotropic film or the polarizer in the area for the right eye L: information of the optical anisotropic film or the polarizer in the area for the left eye

TABLE 10

| | Angle (degrees) | | Retardation (nm) | | | | I (nm) | | I/T | |
|---|---|---|---|---|---|---|---|---|---|---|
| | | | $R_{in}$ | | $R_{th}$ | | | | | |
| | R | L | R | L | R | L | R | L | R | L |
| +B Plate | 45 | −45 | 125 | 125 | 140 | 140 | 400 | 400 | About 1.43 | About 1.43 |
| +B Plate | 0 | 0 | 275 | 275 | 140 | 140 | — | — | — | — |
| Polarizer | 90 | 90 | — | — | — | — | — | — | — | — |

Angles: an angle of the optical axis of the optical anisotropic film or the light absorbing axis of the polarizer (the angles were measured from the light absorbing axis of the second polarizing plate in the stereoscopic image display device; an angle measured clockwise from the light absorbing axis of the second polarizing plate in the device is marked as positive value; an angle measured counterclockwise is marked as negative value; and the measurement was performed in the state in which the polarizing glasses were arranged so that the imaginary line connecting centers of the areas for the left eye and for the right eye of the polarizing glasses can be parallel to the light absorbing axis of the second polarizing plate of the device).
$R_{in}$: the in-plane retardation of the optical anisotropic film
$R_{th}$: the retardation in a thickness direction of the optical anisotropic film
I: the in-plane retardation of the optical anisotropic layer calculated as in the Formula 1
I/T: the ratio of the in-plane retardation to retardation in a thickness direction of the optical anisotropic layer, calculated as in the Formula 2
R: information of the optical anisotropic film or the polarizer in the area for the right eye
L: information of the optical anisotropic film or the polarizer in the area for the left eye Comparative Example 1

The viewing angle characteristic was evaluated by the same method as described in Example 1, except that conventional polarizing glasses that was used for observing the stereoscopic image including the left-circularly polarized light and the right-circularly polarized light, and that did not include the optical anisotropic layer according to the present invention was used.

Viewing Angle Characteristic Examination

Figure 20:
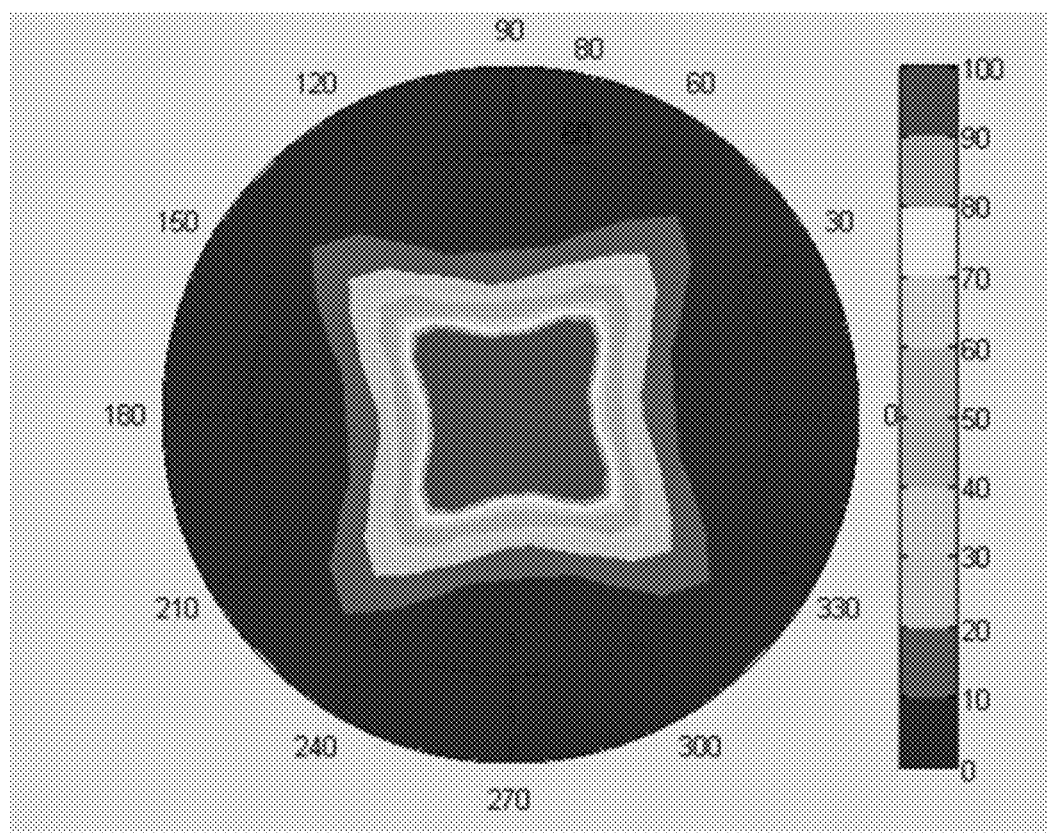

FIGS. 10 to 19 illustrate viewing angle characteristic simulation results of Examples 1 to 10, and FIG. 20 is a viewing angle characteristic evaluation result of comparative example 1. As can been seen from FIGS. 10 to 20, when using the polarizing glasses according to the present invention, the crosstalk can be minimized, and an excellent viewing angle characteristic can be obtained.

Examples 11 to 20

Figure 9:
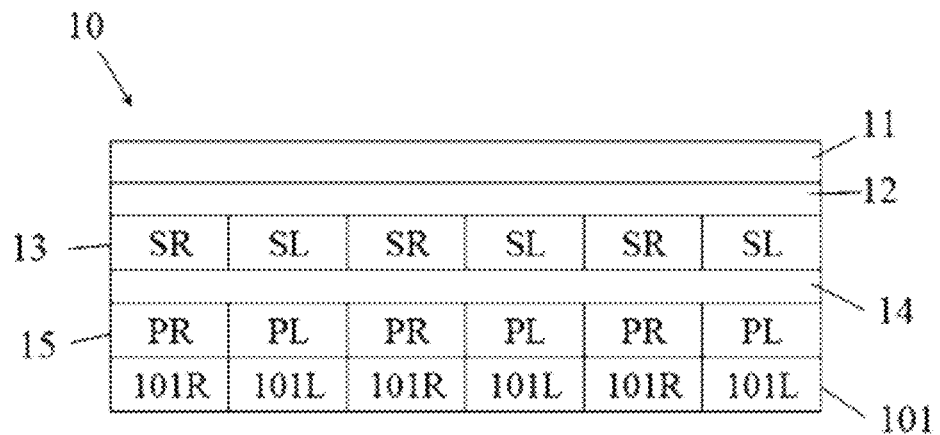
FIG. 9 shows a schematic of an illustrative embodiment of the exemplary stereoscopic image display device.
Figure 10:
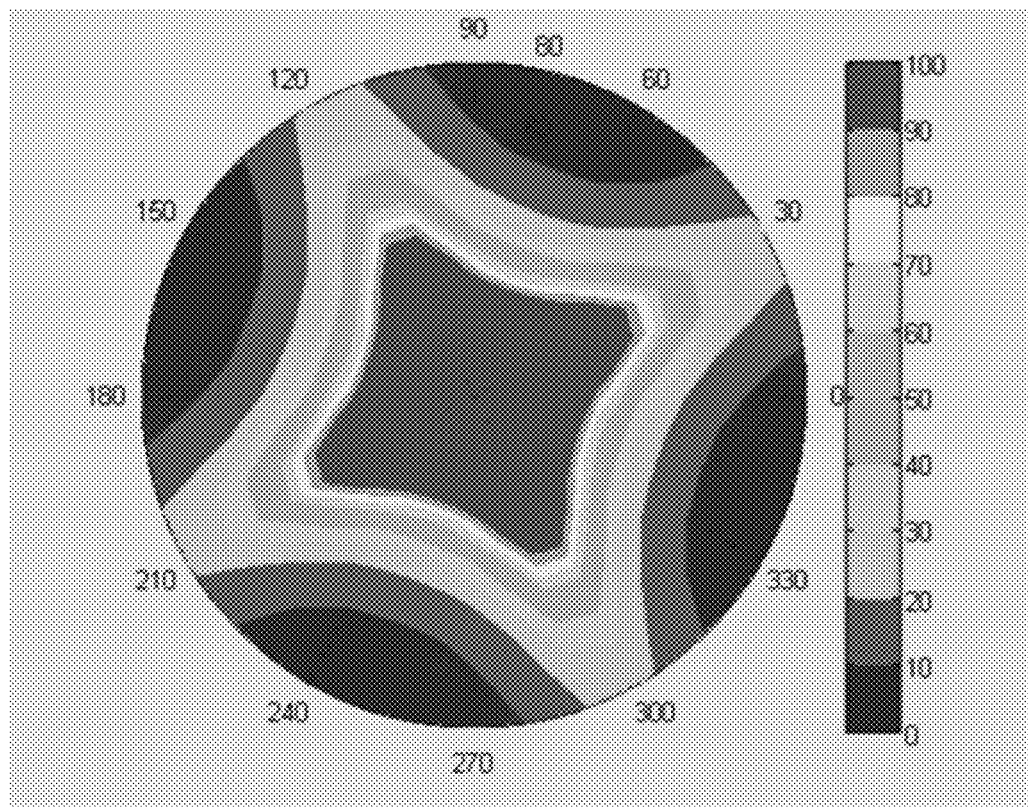
FIGS. 10 to 20 are drawing for explaining viewing angle characteristic evaluation results according to examples and a comparative example.
Figure 11:
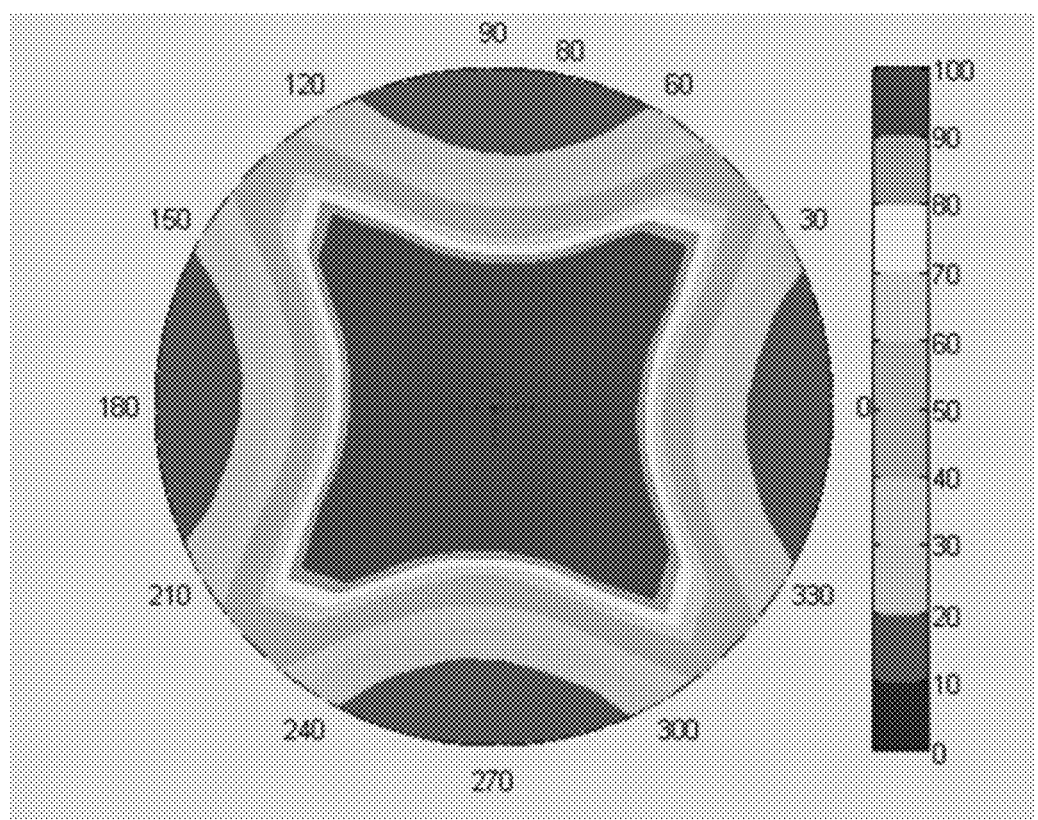
Figure 12:
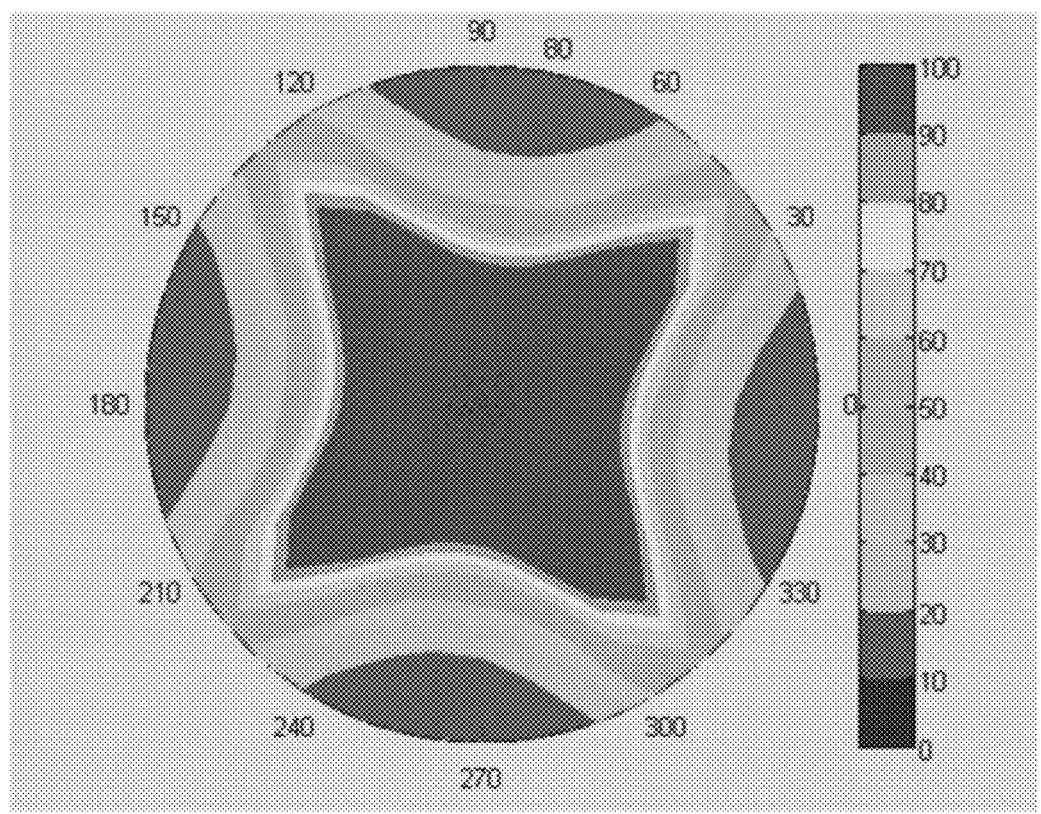
Figure 13:
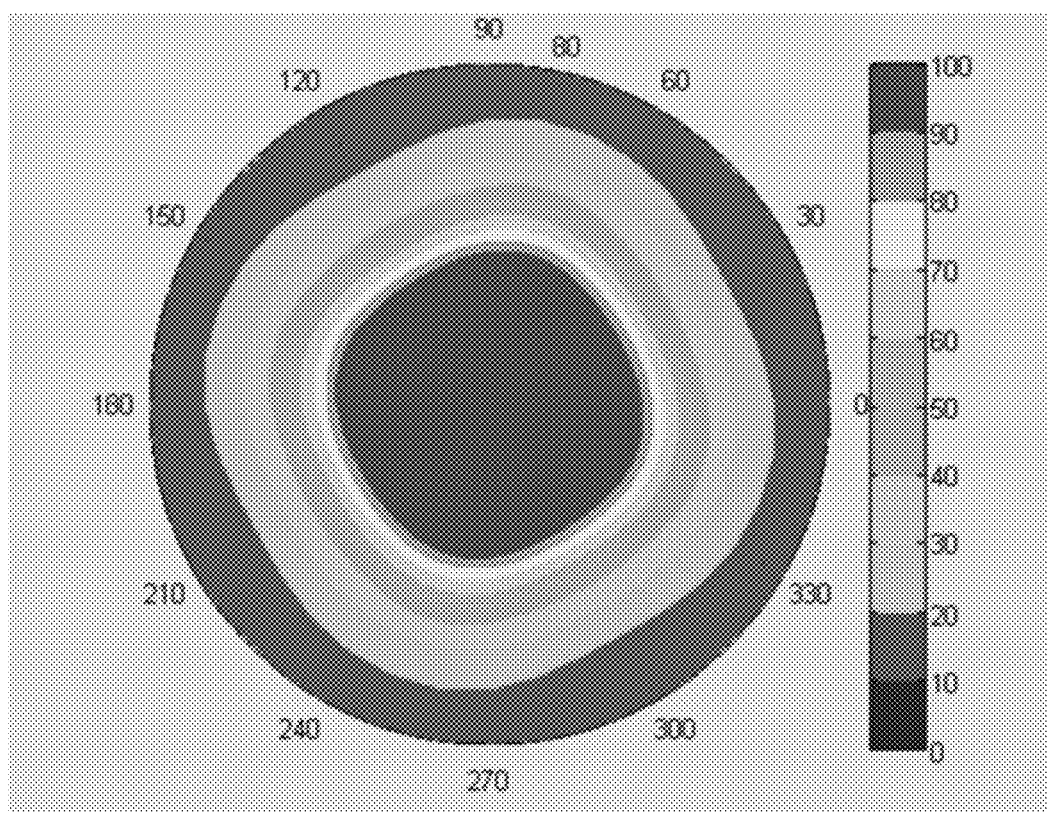
Figure 14:
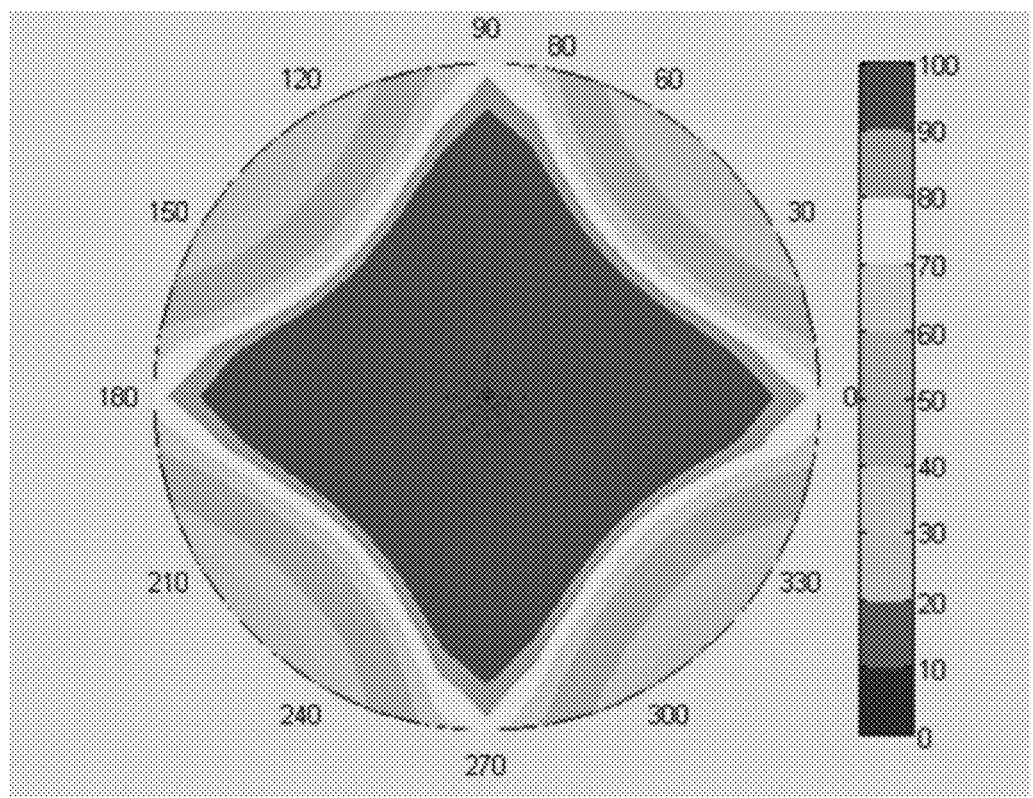
Figure 15:
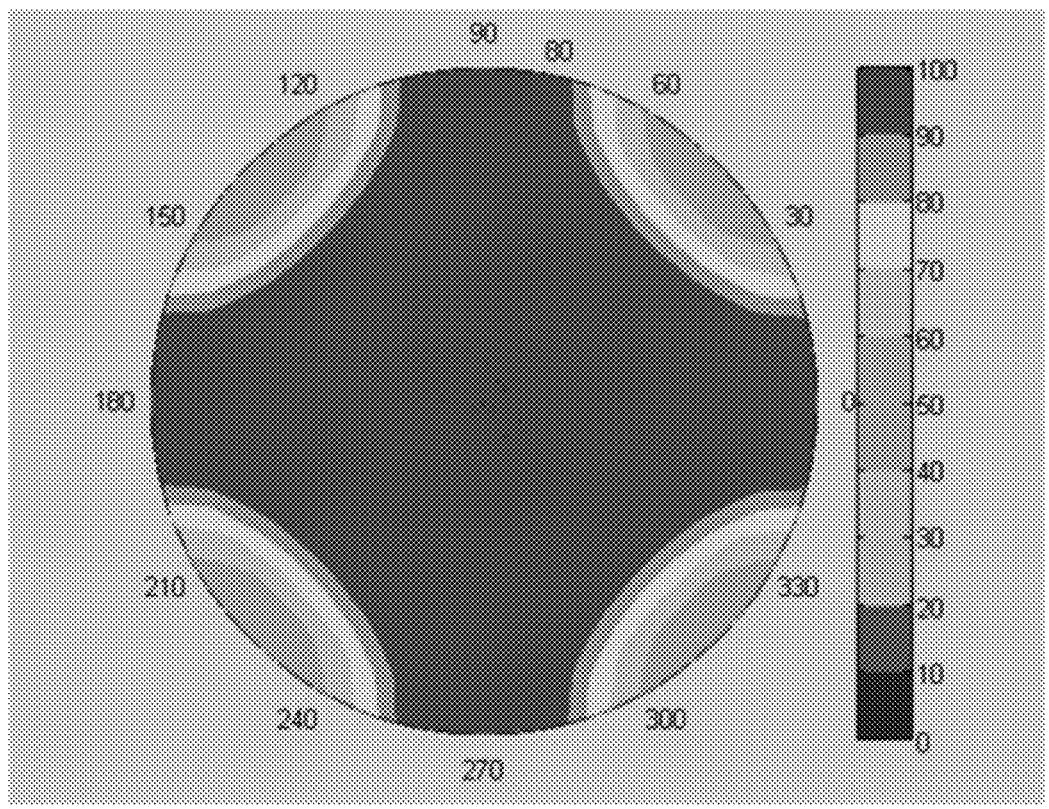
Figure 16:
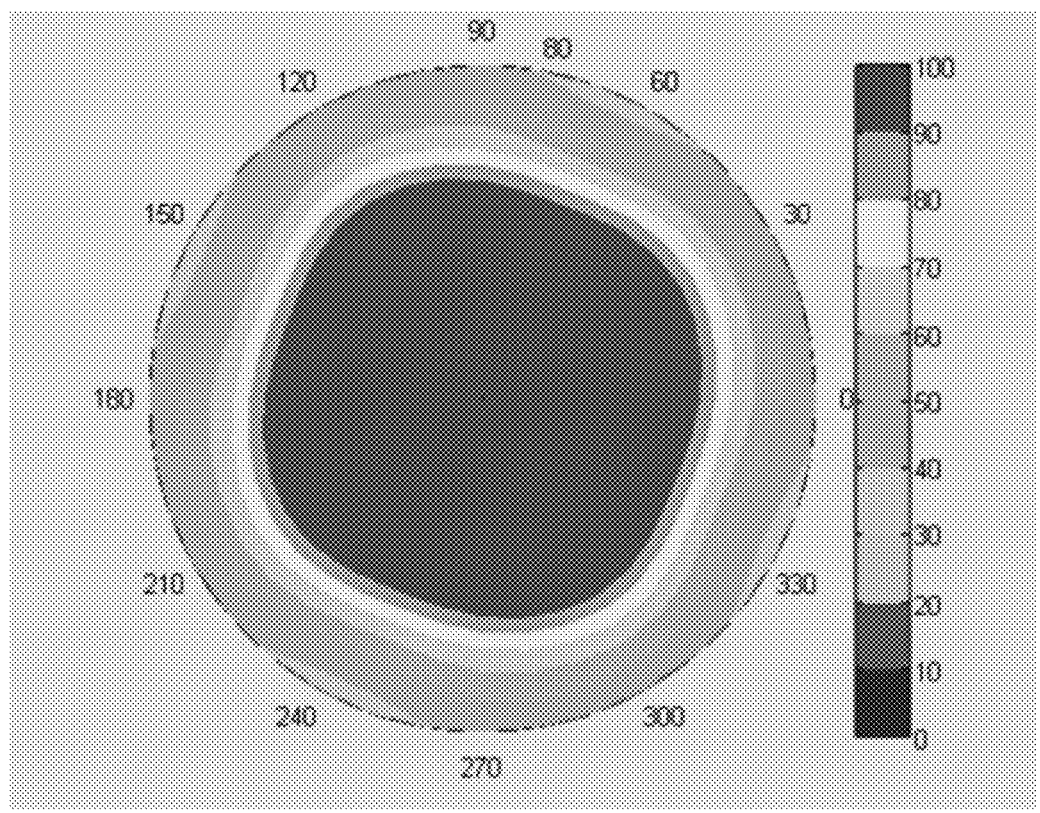
Figure 17:
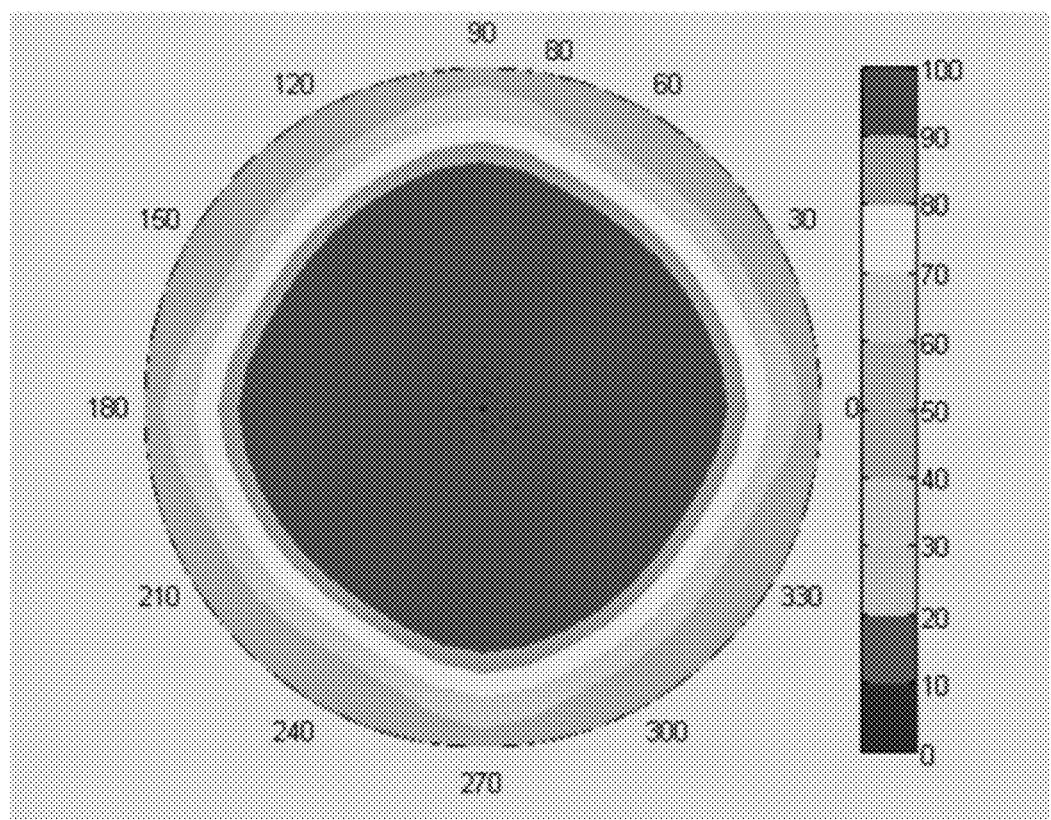
Figure 18:
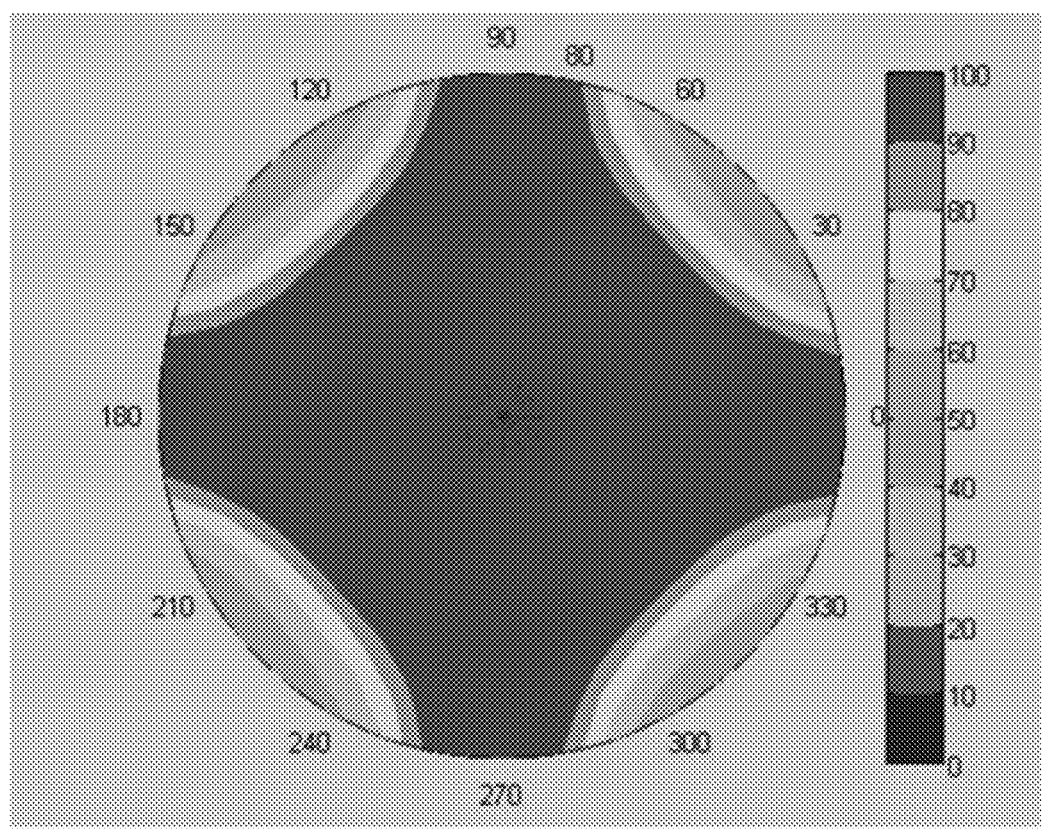
Figure 19:
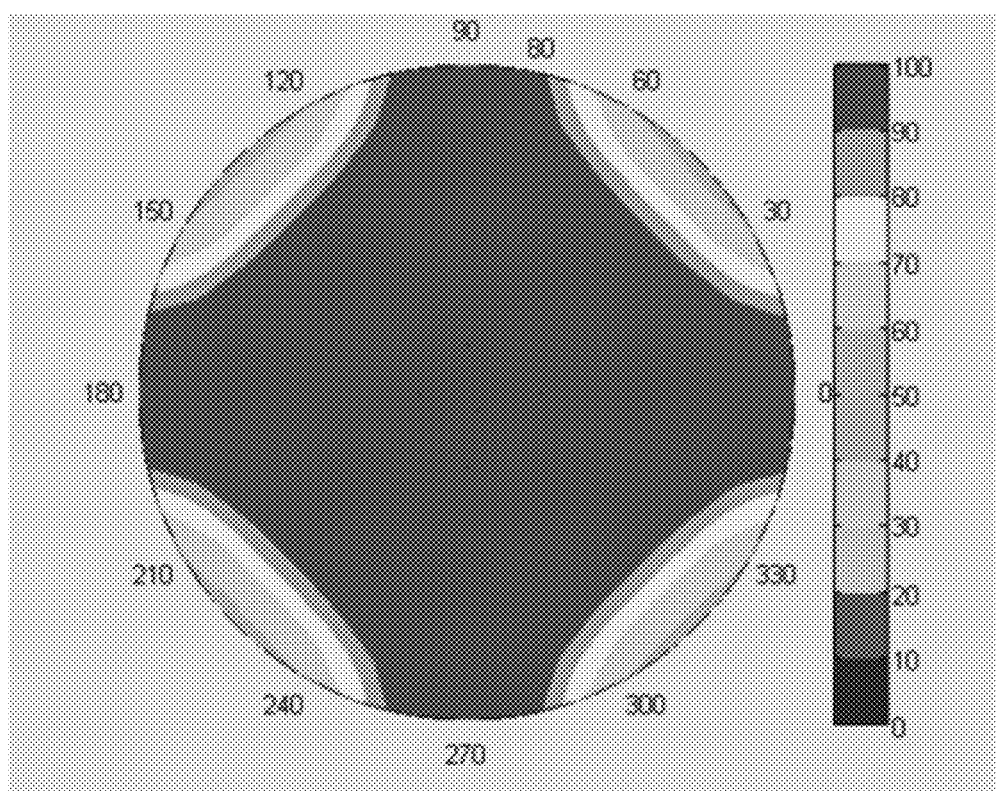

In Examples 11 to 20, the viewing angle characteristics were evaluated by the same method as described in Examples 1 to 10 respectively, except that the optical anisotropic layers were attached on the front side of the polarization adjusting element 15 instead of the polarizers in the polarizing glasses so as to prepare the stereoscopic image display device as in FIG. 9, and the stereoscopic image emitted from the device was observed by polarizing glasses which was the same glasses as in Examples 1 to 10 respectively, but did not include the optical anisotropic layer. In the above, the conditions such as the optical axes, and the like of the optical anisotropic layer 101R contacting the polarization adjusting area for the right eye signal in the polarization adjusting element 15 were adjusted in the same manner as the optical anisotropic layer in the area for the right eye of the polarizing glasses according to the corresponding example, and the conditions such as the optical axes, and the like of the optical anisotropic layer 101L contacting the polarization adjusting area for the left eye signal of the polarization adjusting element 15 was adjusted in the same manner as the optical anisotropic layer in the area for the left eye of the polarizing glasses according to the corresponding example. Further, an order of the optical anisotropic films attached on the polarization adjusting element 15 was the same as in the corresponding example, and the optical anisotropic film attached directly on the polarizer of the polarizing glasses in the corresponding example was attached farthest from the polarization adjusting element 15. For example, in the case of Example 11 that corresponds to Example 1, the −B plate was attached on the polarization adjusting element 15, and then the +C plate was attached to the −B plate. As a result of observing the stereoscopic image emitted from the stereoscopic image display device having the aforementioned configuration and evaluating the result, it was confirmed that Example 11 to 20 showed the same characteristics as in Examples 1 to 10 respectively.

According to polarizing glasses and stereoscopic image display device of the present invention, the crosstalk can be prevented without sacrificing brightness when a stereoscopic image is observed, and the stereoscopic image with excellent quality can be observed at a wider viewing angle.

While the invention has been shown and described with reference to certain exemplary examples thereof, it will be understood by those skilled in the art that various changes in form and details may be made therein without departing from the spirit and scope of the invention as defined by the appended claims.

What is claimed is:

1. Polarizing glasses, comprising an area for a left eye and an area for a right eye, into which an image signal enters, wherein each of the areas for the left eye and for the right eye comprise an optical anisotropic layer and a polarizer respectively, wherein the optical anisotropic layer comprises at least two optical anisotropic films, and wherein the optical anisotropic layer has a value calculated by Formula 1 in a range from 50 nm to 400 nm, and a value calculated by Formula 2 in a range from 0.1 to 3:

$$DX - DY \qquad \text{[Formula 1]}$$

$$(X-Y)/(Z-Y) \qquad \text{[Formula 2]}$$

where X is a sum of refractive indices for the at least two optical anisotropic films in the direction of an in-plane slow axis of the optical anisotropic layer, Y is a sum of refractive indices for the at least two optical anisotropic films in the direction of an in-plane fast axis of the optical anisotropic layer, Z is sum of refractive indices for the at least two optical anisotropic films in the direction in a thickness of the optical anisotropic layer, and D is a sum of thicknesses for the at least two optical anisotropic films of the optical anisotropic layer.

2. The polarizing glasses according to claim 1, wherein a bisector of an angle formed by a slow axis of the optical anisotropic films in the area for the left eye and a slow axis of the optical anisotropic films in the area for the right eye is perpendicular or parallel to a light absorbing axis of the polarizer.

3. The polarizing glasses according to claim 1, wherein each of the optical anisotropic layers comprise a first A plate or a first B plate respectively, and wherein a bisector of an angle formed by a slow axis of the first A plate or the first B plate in the area for the left eye and a slow axis of the first A plate or the first B plate in the area for the right eye is perpendicular or parallel to a light absorbing axis of the polarizer.

4. The polarizing glasses according to claim 3, wherein the optical anisotropic layer further comprises at least one selected from a group consisting of a second A plate, a second B plate and a C plate; a slow axis of the second A plate or the second B plate in the area for the left eye being parallel to the slow axis of the first A plate or the first B plate in the area for the left eye and a slow axis of the second A plate or the second B plate in the area for the right eye being parallel to the slow axis of the first A plate or the first B plate in the area for the right eye; or the second A plate or the second B plate in the area for the left eye and the second A plate or the second B plate in the area for the right eye having slow axes formed in a direction perpendicular to the light absorbing axis of the polarizer.

5. The polarizing glasses according to claim 3, wherein the optical anisotropic layer comprises a first +B plate and a second +B plate, which are arranged sequentially from a side into which the image signal enters, a bisector of an angle formed by slow axes of the first +B plates in the area for the left eye and in the area for the right eye being perpendicular or parallel to the light absorbing axis of the polarizer, and slow axes of the second +B plates in the area for the left eye and in the area for the right eye being perpendicular to the light absorbing axis of the polarizer.

6. The polarizing glasses according to claim 3, wherein the optical anisotropic layer comprises a −B plate and a +C plate, which are arranged sequentially from a side into which the image signal enters, and a bisector of an angle formed by an optical axes of the −B plates in the area for the left eye and in the area for the right eye being perpendicular or parallel to the light absorbing axis of the polarizer.

7. The polarizing glasses according to claim 3, wherein the optical anisotropic layer comprises a −C plate and a +B plate, which are arranged sequentially from a side into which the image signal enters, and a bisector of an angle formed by an optical axes of the +B plates in the area for the left eye and in the area for the right eye being perpendicular or parallel to the light absorbing axis of the polarizer.

8. The polarizing glasses according to claim 3, wherein the optical anisotropic layer comprises a +A plate and a +B plate, which are arranged sequentially from a side into which the image signal enters, a bisector of angle formed by an optical axes of the +B plates in the area for the left eye and in the area for the right eye being perpendicular or parallel to the light absorbing axis of the polarizer, and the +A plate in the area for the left eye having an optical axis in a direction parallel to the optical axis of the +B plate in the area for the left eye, and the +A plate in the area for the right eye having an optical axis in a direction parallel to the optical axis of the +B plate in the area for the right eye.

9. The polarizing glasses according to claim 3, wherein the optical anisotropic layer comprises a +B plate and a +A plate, which are arranged sequentially from a side into which the image signal enters, a bisector of an angle formed by an optical axes of the +B plates in the area for the left eye and in the area for the right eye being perpendicular or parallel to the light absorbing axis of the polarizer, and the +A plates in the area for the left eye and in the area for the right eye having optical axes in a direction perpendicular to the light absorbing axis of the polarizer.

10. The polarizing glasses according to claim 3, wherein the optical anisotropic layer comprises a −C plate, a +B plate and a +A plate, which are arranged sequentially from a side into with the image signal enters, a bisector of an angle formed by an optical axes of the +B plates in the area for the left eye and in the area for the right eye being perpendicular or parallel to the light absorbing axis of the polarizer, and optical axes of the +A plates in the area for the left eye and in the area for the right eye being formed in a direction perpendicular to the light absorbing axis of the polarizer.

11. The polarizing glasses according to claim 3, wherein the optical anisotropic layer comprises a first +A plate, a +B plate, and a second +A plate, which are arranged sequentially from a side into which the image signal enters, a bisector of an angle formed by an optical axes of the +B plates in the area for the left eye and in the area for the right eye being perpendicular or parallel to the light absorbing axis of the polarizer, the first +A plate in the area for the left eye having an optical axis in the same direction as the +B plate in the area for the left eye, the first +A plate in the area for the right eye having an optical axis in the same direction as the +B plate in the area for the right eye, and the second +A plates in the area for the left eye and in the area for the right eye having optical axes formed in a direction perpendicular to the light absorbing axis of the polarizer.

12. The polarizing glasses according to claim 3, wherein the optical anisotropic layer comprises a +B plate, a +C plate and a +A plate, which are arranged sequentially from a side into which the image signal enters, a bisector of angle formed by optical axes of the +B plates in the area for the left eye and in the area for the right eye being perpendicular or parallel to the light absorbing axis of the polarizer, and the +A plates in the area for the left eye and the area for the right eye having optical axes formed in a direction perpendicular to the light absorbing axis of the polarizer.

13. The polarizing glasses according to claim 3, wherein the optical anisotropic layer comprises a first +A plate, a +C plate and a second +A plate, which are arranged sequentially from a side into which the image signal enters, a bisector of an angle formed by optical axes of the first +A plates in the area for the left eye and the area for the right eye being perpendicular or parallel to the light absorbing axis of the polarizer, and the second +A plates in the area for the left eye and the area for the right eye having optical axes formed in a direction perpendicular to the light absorbing axis of the polarizer.

14. The polarizing glasses according to claim 3, wherein the optical anisotropic layer comprises a first +C plate, a first +A plate, a second +C plate, and a second +A plate, which are arranged sequentially from a side into which the image signal enters, a bisector of an angle formed by optical axes of the first +A plates in the area for the left eye and in the area for the right eye being perpendicular or parallel to the light absorbing axis of the polarizer, and the second +A plates in the area for the left eye and in the area for the right eye having optical axes formed in a direction perpendicular to the light absorbing axis of the polarizer.

15. The polarizing glasses according to claim 1 or 3, wherein the image signal comprises a left-circularly polarized light and a right-circularly polarized light.

16. The polarizing glasses according to claim 1 or 3, wherein the image signal is emitted from a stereoscopic image display device comprising a stereoscopic image generating unit that is capable of generating a left eye signal and a right eye signal and then is capable of transferring the left eye signal and the right eye signal to an observer side in a driven state, and that comprises a first polarizing plate, an image generating element, and a second polarizing plate, which are sequentially arranged; and a polarization adjusting layer that comprises a polarization adjusting area for the left eye signal and a polarization adjusting area for the right eye signal that are capable of receiving the image signals transferred from the image generating unit and adjusting the signals so that the left eye signal and the right eye signal have different polarized states from each other, and then is capable of transferring the left eye signal and the right eye signal to the observer side, the polarization adjusting area for the left eye signal and the polarization adjusting area for the right eye signal comprising a $\lambda/4$ plate respectively, and an optical axis of the $\lambda/4$ plate in polarization adjusting area for the left eye signal being different from an optical axis of the $\lambda/4$ plate in the polarization adjusting area for the right eye signal.

17. The polarizing glasses according to claim 16, wherein the polarizer having the light absorbing axis in a direction perpendicular to the light absorbing axis of the second polarizing plate in a state in which the polarizing glasses is arranged so that an imaginary line connecting the centers of the areas for the left eye and the area for the right eye is parallel to the light absorbing axis of the second polarizing plate.

* * * * *